(12) United States Patent
Higuchi et al.

(10) Patent No.: US 7,522,194 B2
(45) Date of Patent: Apr. 21, 2009

(54) ELECTRONIC CAMERA

(75) Inventors: Tatsuji Higuchi, Akiruno (JP); Akio Terane, Sagamihara (JP)

(73) Assignee: Olympus Corporation (JP)

( * ) Notice: Subject to any disclaimer, the term of this patent is extended or adjusted under 35 U.S.C. 154(b) by 709 days.

(21) Appl. No.: 11/157,332

(22) Filed: Jun. 15, 2005

(65) Prior Publication Data

US 2005/0231601 A1 Oct. 20, 2005

Related U.S. Application Data

(62) Division of application No. 09/651,770, filed on Aug. 30, 2000, now Pat. No. 6,930,712.

(30) Foreign Application Priority Data

Sep. 1, 1999 (JP) ................................. 11-247856
Sep. 1, 1999 (JP) ................................. 11-247857
Sep. 1, 1999 (JP) ................................. 11-247858

(51) Int. Cl.
*H04N 5/76* (2006.01)
(52) U.S. Cl. ...................... 348/231.2; 348/311; 348/312
(58) Field of Classification Search ............ 348/231.99, 348/231.2, 231.6, 333.01, 333.11, 333.12
See application file for complete search history.

(56) References Cited

U.S. PATENT DOCUMENTS 5,576,758 A * 11/1996 Arai et al. ................. 348/220.1

(Continued)

FOREIGN PATENT DOCUMENTS

JP 62-117883 7/1987

(Continued)

OTHER PUBLICATIONS

Japanese Office Action dated Aug. 27, 2002.

(Continued)

*Primary Examiner*—Tuan V Ho
(74) *Attorney, Agent, or Firm*—Ostrolenk, Faber, Gerb & Soffen, LLP

(57) ABSTRACT

An electronic camera comprises imaging means for optoelectrically converting a subject image to generate electronic image data, temporary storage means for temporarily storing the image data produced by the imaging means, image display means for displaying an image based on the image data stored in the temporary storage means, recording means for recording the image data stored in the temporary storage means on a recording medium, erasing means for erasing the image data recorded on the recording medium, instructing means for instructing the recording means to abort recording on the recording medium of the image data stored in the temporary storage means or for instructing the era-sing means to erase the image data recorded on the recording medium, and control means for controlling the image display means to display thereon the image based on the image data stored in the temporary storage means for a predetermined period of time after capturing, for controlling the recording means to abort recording on the recording medium of the image data stored in the temporary storage means when an instruction is given from the instructing means while the recording means is recording the image data on the recording medium, and for controlling the erasing means to erase the image data recorded on the recording medium when an instruction is given from the instructing means after the recording means has recorded the image data on the recording medium.

15 Claims, 23 Drawing Sheets

U.S. PATENT DOCUMENTS

| | | | | |
|---|---|---|---|---|
| 6,122,003 A | * | 9/2000 | Anderson | 348/207.99 |
| 6,310,648 B1 | * | 10/2001 | Miller et al. | 348/333.05 |
| 6,549,232 B1 | * | 4/2003 | Taniguchi et al. | 348/231.99 |
| 6,816,190 B1 | * | 11/2004 | Miyazawa | 348/231.6 |

FOREIGN PATENT DOCUMENTS

| | | |
|---|---|---|
| JP | 2-172365 | 7/1990 |
| JP | 10257370 | 9/1998 |
| JP | 10262203 | 9/1998 |
| JP | 1127616 | 1/1999 |
| JP | 11146326 | 5/1999 |
| JP | 11220638 | 8/1999 |

OTHER PUBLICATIONS

Japanese Office Action mailed Dec. 2, 2003.

English-language transaction of Japanese Office Action mailed Dec. 2, 2003.

Japanese Office Action dated Apr. 16, 2002.

* cited by examiner

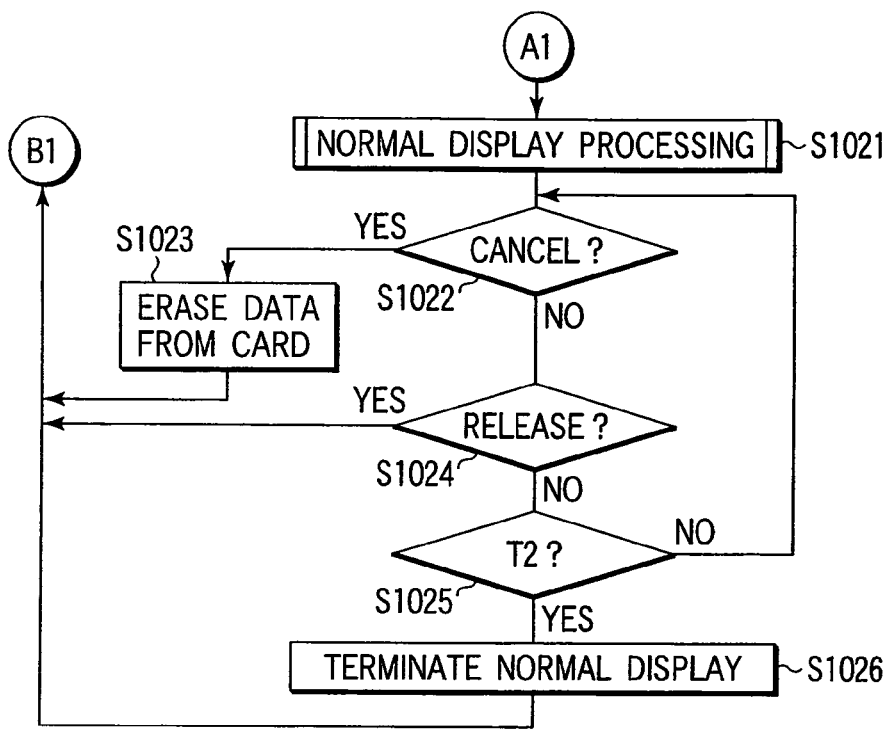
FIG. 3
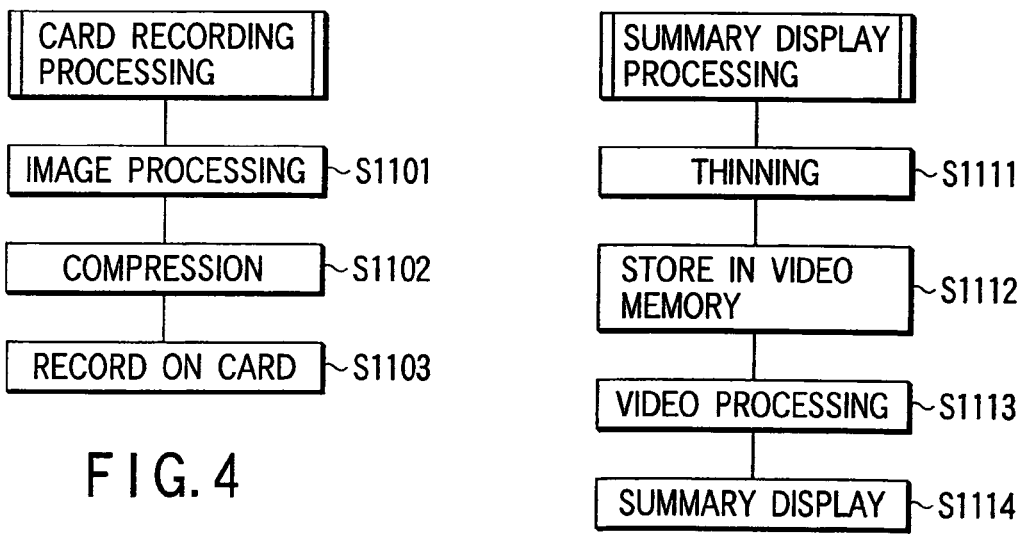
FIG. 4
FIG. 5

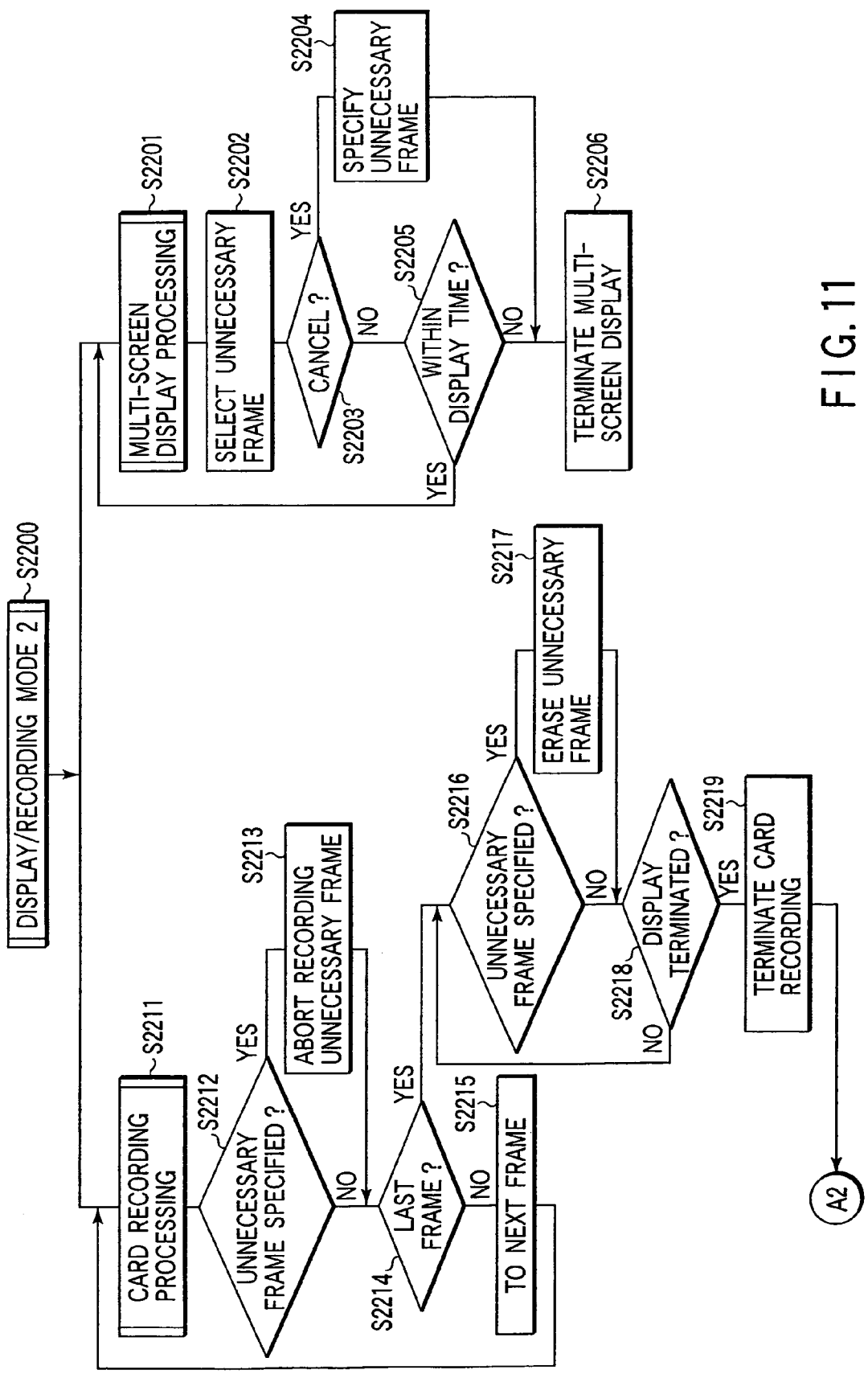
F I G. 11

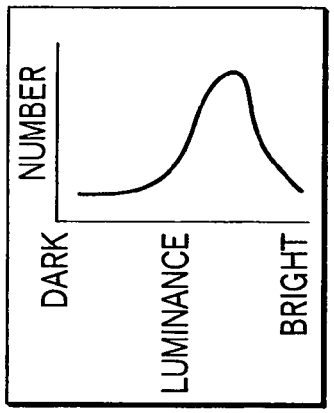
FIG. 16A
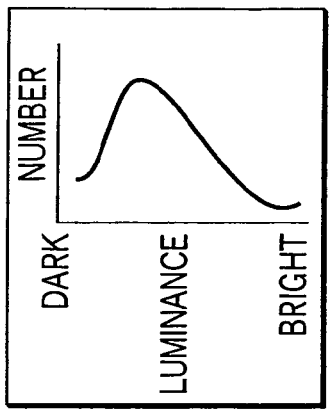
FIG. 16B
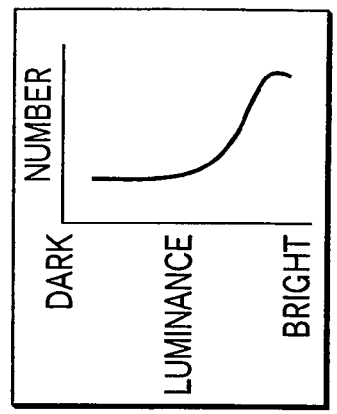
FIG. 16C
FIG. 17
RECORDING MEMORY : NO1 80KB, NO2 105KB,
  NO3 91KB
AF : NO1 50, NO2 80, NO3 40
AE : NO1 1/250 F5.6
  NO2 1/250 F4
  NO3 1/125 F5.6
GV : NO1 20, NO2 28, NO3 40
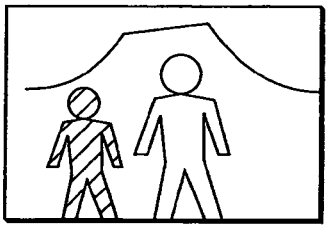
FIG. 18A
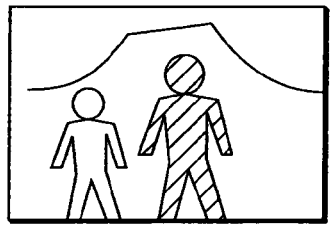
FIG. 18B
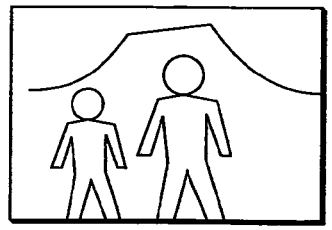
FIG. 18C

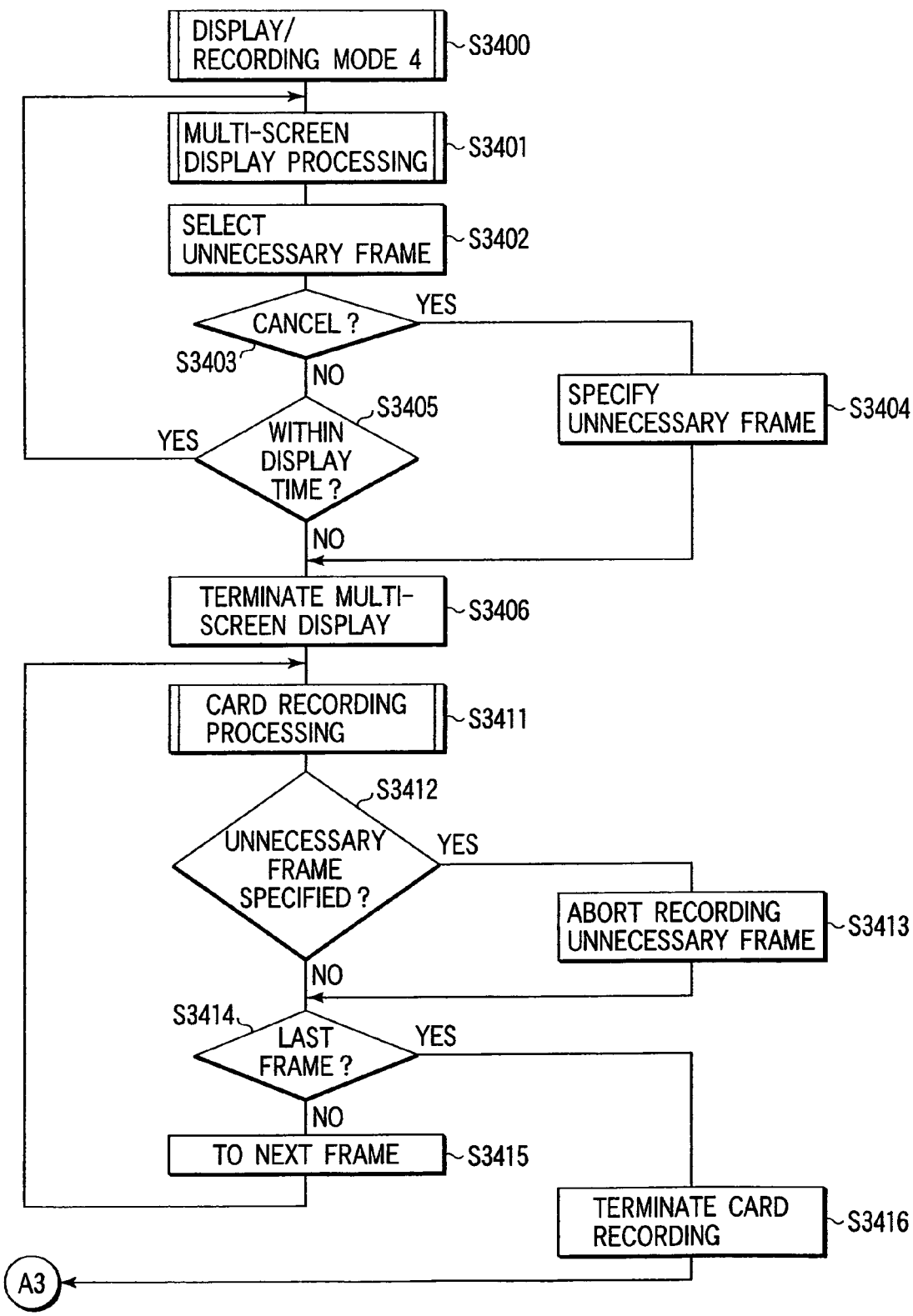
F I G. 27

ELECTRONIC CAMERA

CROSS-REFERENCE TO RELATED APPLICATIONS

This application is a divisional of U.S. application Ser. No. 09/651,770 filed Aug. 30, 2000, entitled ELECTRONIC CAMERA and is based upon and claims the benefit of priority from the prior Japanese Patent Applications No. 11-247856, Sep. 1, 1999; No. 11-247857, Sep. 1, 1999; and No. 11-247858, Sep. 1, 1999, the entire contents of which are incorporated herein by reference.

BACKGROUND OF THE INVENTION

Electronic cameras (digital cameras), unlike silver salt based cameras, feature the ability of confirming an image captured at the site the image has just been captured. There have been proposed electronic cameras which have a function of automatically displaying a captured image on LCD or the like just after the image is captured (hereinafter, referred to as the "rec-view function"), making good use of this feature.

The rec-view function, however, is intended to automatically display captured images. Therefore, even if it is determined from the confirmation of a captured image through the rec-view function that image data of the captured image need not be stored on a recording medium such as a memory card, the image data cannot be readily erased from the recording medium. In other words, the photographer is involved in a sequence of tedious operations including once switching the electronic camera to an erasure mode and performing an erasure operation.

Also, when an attempt is made to apply the rec-view function as it is to sequential capturing (continuous capturing) in which a plurality of images are sequentially captured at short regular time intervals, the electronic camera will present significantly poor usability. Specifically, captured images are sequentially displayed on a one-by-one basis on the screen at short time intervals corresponding to the sequential capturing, so that the photographer cannot sufficiently confirm the respective captured images.

Particularly, the sequential capturing may often end up with production of images which need not be recorded on a recording medium. If captured images are displayed in the manner mentioned above, the photographer will experience extreme difficulties in distinguishing images which should be recorded on a recording medium from images which need not be recorded on the recording medium. The difficulties further lead to difficulties in recording only image data of images, which should be recorded, on a recording medium.

Also, when a plurality of images are sequentially captured at short time intervals in a normal capturing mode (hereinafter referred to as the "quick capturing"), the photographer would suffer from an extremely poor usability of the rec-view function, if it is applied as it is. Specifically, captured images are sequentially displayed on the screen on one-by-one basis at short time intervals corresponding to the quick capturing, so that the photographer will feel an inconvenience in the inability of sufficiently confirming the respective captured images.

Particularly, the quick capturing may often end up with production of images which need not be recorded on a recording medium. If captured images are displayed in the manner mentioned above, the photographer will experience extreme difficulties in distinguishing images which should be recorded on a recording medium from images which need not be recorded on the recording medium.

Further, unlike the sequential capturing, since the quick capturing is performed in a normal capturing mode, it is indefinite from which image to which image are handled as a set of images taken in a quick capturing sequence, in which case difficulties arise in handling image data for displaying and/or recording the images.

BRIEF SUMMARY OF THE INVENTION

It is a first object of the present invention to provide an electronic camera having a rec-view function, which is capable of readily aborting recording of image data without once setting the electronic camera to an erasure mode, when it is determined that the image data produced by a capture need not be recorded on a recording medium.

It is a second object of the present invention to provide an electronic camera having a rec-view function, which is capable of displaying a plurality of images produced by sequential capturing on a single multi-screen to readily distinguish images which should be recorded (preserved) on a recording medium from images which need not be recorded, and thereby readily recording only image data of the images which should be recorded on the recording medium.

It is a third object of the present invention to provide an electronic camera which offers a good usability, easy handling of image data, and the like when a set of images are to be taken through a quick capturing or the like.

An electronic camera according to a first aspect of the present invention comprises imaging means for optoelectrically converting a subject image to generate electronic image data, temporary storage means for temporarily storing the image data produced by the imaging means, image display means for displaying an image based on the image data stored in the temporary storage means, recording means for recording the image data stored in the temporary storage means on a recording medium, erasing means for erasing the image data recorded on the recording medium, instructing means for instructing the recording means to abort recording on the recording medium of the image data stored in the temporary storage means or for instructing the erasing means to erase the image data recorded on the recording medium, and control means for controlling the image display means to display thereon the image based on the image data stored in the temporary storage means for a predetermined period of time after capturing, for controlling the recording means to abort recording on the recording medium of the image data stored in the temporary storage means when an instruction is given from the instructing means while the recording means is recording the image data on the recording medium, and for controlling the erasing means to erase the image data recorded on the recording medium when an instruction is given from the instructing means after the recording means has recorded the image data on the recording medium.

An electronic camera according to a second aspect of the present invention comprises imaging means for optoelectrically converting a subject image to generate electronic image data, temporary storage means for temporarily storing the image data produced by the imaging means, recording means for recording the image data stored in the temporary storage means on a recording medium, erasing means for erasing the image data recorded on the recording medium, instructing means for instructing the recording means to abort recording on the recording medium of the image data stored in the temporary storage means or for instructing the erasing means to erase the image data recorded on the recording medium, image display means for displaying an image based on the image data, and control means operative when the recording means is recording the image data on the recording medium for controlling the image display means to display thereon the image based on the image data stored in the temporary storage means and controlling the recording means to abort recording the image data stored in the temporary storage means on the recording medium in response to an instruction from the instructing means, and operative when the recording means has recorded the image data on the recording medium for controlling the image display means to display thereon the image based on the image data recorded on the recording medium for a period of time provided for displaying the image and controlling the erasing means to erase the image data recorded on the recording medium in response to an instruction from the instructing means.

In the first or second aspect, preferably, the control means controls the electronic camera to restore a capturing enabled state after aborting the recording of the image data stored in the temporary storage means on the recording medium or after erasing the image data recorded on the recording medium.

In the first or second aspect, preferably, the electronic camera further comprises setting means for setting at least one of a display time of the image based on the image data stored in the temporary storage means and a display time of the image based on the image data recorded on the recording medium, wherein the control means controls the image display means to display thereon the image based on the image data in accordance with the display time set by the setting means.

An electronic camera according to a third aspect of the present invention is an electronic camera capable of sequentially capturing images, which comprises imaging means for optoelectrically converting a subject image to produce electronic image data, temporary storage means for temporarily storing a plurality of image data produced by the imaging means based on sequential capturing, recording means for recording the image data stored in the temporary storage means on a recording medium, image display means for displaying an image based on the image data, instructing means for distinguishing images whose image data are to be preserved on the recording medium from images whose image data are not preserved on the recording medium, and control means operative after completion of the sequential capturing for controlling the image display means to display thereon images based on the respective image data produced by the sequential capturing, and for controlling the recording means not to preserve on the recording medium the image data of images which have been distinguished as not being preserved on the basis of an instruction from the instructing means within the plurality of image data produced by the sequential capturing.

An electronic camera according to a fourth aspect of the present invention is an electronic camera capable of sequentially capturing images, which comprises imaging means for optoelectrically converting a subject image to produce electronic image data, temporary storage means for temporarily storing a plurality of image data produced by the imaging means based on sequential capturing, recording means for recording the image data stored in the temporary storage means on a recording medium, image display means for displaying an image based on the image data, instructing means for distinguishing images whose image data are to be preserved on the recording medium from images whose image data are not preserved on the recording medium, and control means operative after completion of the sequential capturing for controlling the image display means to display thereon images based on the respective image data produced by the sequential capturing and controlling the recording means in parallel to record the image data produced by the sequential capturing on the recording medium, and for controlling the recording means not to preserve on the recording medium the image data of images which have been distinguished as not being preserved on the basis of an instruction from the instructing means within the plurality of image data produced by the sequential capturing.

An electronic camera according to a fifth aspect of the present invention is an electronic camera capable of sequentially capturing images, which comprises imaging means for optoelectrically converting a subject image to produce electronic image data, temporary storage means for temporarily storing a plurality of image data produced by the imaging means based on sequential capturing, recording means for recording the image data stored in the temporary storage means on a recording medium, image display means for displaying an image based on the image data, instructing means for distinguishing images whose image data are to be preserved on the recording medium from images whose image data are not preserved on the recording medium, and control means operative after completion of the sequential capturing for controlling the image display means to display thereon images based on the respective image data produced by the sequential capturing, operative after completion of the display for controlling the recording means to record the image data produced by the sequential capturing on the recording medium, and for controlling the recording means not to preserve on the recording medium the image data of images which have been distinguished as not being preserved on the basis of an instruction from the instructing means within the plurality of image data produced by the sequential capturing.

In the third, fourth or fifth aspect, preferably, the image display means displays respective images based on respective image data produced by the sequential capturing at fixed display time intervals, and the electronic camera further comprises display time interval setting means for setting the time interval.

In the third, fourth or fifth aspect, preferably, the control means controls the electronic camera to restore a capturing enabled state after the image data has been recorded on the recording medium.

In the third, fourth or fifth aspect, preferably, the image display means displays a plurality of images based on respective image data produced by the sequential capturing as a collection of images comprised of a plurality of smaller screen regions.

In the third, fourth or fifth aspect, preferably, the image display means displays capture information during the sequential capturing together with or independently of the images based on the image data produced by the sequential capturing.

An electronic camera according to a sixth aspect of the present invention comprises imaging means for optoelectrically converting a subject image to generate electronic image data, temporary storage means for temporarily storing a plurality of image data produced by the imaging means, recording means for recording the image data stored in the temporary storage means on a recording medium, image display means for displaying an image based on the image data, set capturing determining means for determining a plurality of sequential captures as set capturing, wherein the set capturing determining means includes start determining means for determining the start of the set capturing, and end determining means for determining the end of the set capturing, instructing means for distinguishing images whose image data are to be preserved on the recording medium from images whose image data are not preserved on the recording medium, and control means operative after completion of the set capturing for controlling the image display means to display thereon an image based on each image data produced by the set capturing, and for controlling the recording means not to preserve on the recording medium the image data of images which have been distinguished as not being preserved on the basis of an instruction from the instructing means within the plurality of image data produced by the set capturing.

An electronic camera according to a seventh aspect of the present invention comprises imaging means for optoelectrically converting a subject image to generate electronic image data, temporary storage means for temporarily storing a plurality of image data produced by the imaging means, recording means for recording the image data stored in the temporary storage means on a recording medium, image display means for displaying an image based on the image data, set capturing determining means for determining a plurality of sequential captures as set capturing, wherein the set capturing determining means includes start determining means for determining the start of the set capturing, and end determining means for determining the end of the set capturing, instructing means for distinguishing images whose image data are to be preserved on the recording medium from images whose image data are not preserved on the recording medium, and control means operative after completion of the set capturing for controlling the image display means to display thereon an image based on each image data produced by the set capturing and controlling the recording means in parallel to record the image data produced by the set capturing on the recording medium, and for controlling the recording means not to preserve on the recording medium the image data of images which have been distinguished as not being preserved on the basis of an instruction from the instructing means within the plurality of image data produced by the set capturing.

An electronic camera according to an eighth aspect of the present invention comprises imaging means for optoelectrically converting a subject image to generate electronic image data, temporary storage means for temporarily storing a plurality of image data produced by the imaging means, recording means for recording the image data stored in the temporary storage means on a recording medium, image display means for displaying an image based on the image data, set capturing determining means for determining a plurality of sequential captures as set capturing, wherein the set capturing determining means includes start determining means for determining the start of the set capturing, and end determining means for determining the end of the set capturing, instructing means for distinguishing images whose image data are to be preserved on the recording medium from images whose image data are not preserved on the recording medium, and control means operative after completion of the set capturing for controlling the image display means to display thereon an image based on each image data produced by the set capturing, operative after completion of the display for controlling the recording means to record the image data produced by the set capturing on the recording medium, and for controlling the recording means not to preserve on the recording medium the image data of images which have been distinguished as not being preserved on the basis of an instruction from the instructing means within the plurality of image data produced by the set capturing.

In the sixth, seventh or eighth aspect, preferably, the start determining means determines, when the capturing is instructed, the start of the set capturing when the number of image frames corresponding to image data which have not been recorded on the recording medium is equal to or more than a predetermined number within a plurality of image data stored in the temporary storage means.

In the sixth, seventh or eighth aspect, preferably, the start determining means determines the start of the set capturing when a next capture is started before image data produced by a capture has not been recorded on the recording medium.

In the sixth, seventh or eighth aspect, preferably, the start determining means determines the start of the set capturing when a capturing time interval is within a predetermined time. In this case, preferably, the electronic camera further comprises changing means for changing the predetermined time.

In the sixth, seventh or eighth aspect, preferably, the start determining means determines the start of the set capturing when a photographer instructs the start through a manipulation.

In the sixth, seventh or eighth aspect, preferably, the end determining means determines the end of the set capturing when a capturing time interval is equal to or longer than a predetermined time. In this case, preferably, the electronic camera further comprises changing means for changing the predetermined time.

In the sixth, seventh or eighth aspect, preferably, the end determining means determines the end of the set capturing when a photographer instructs the end through a manipulation.

In the sixth, seventh or eighth aspect, preferably, the image display means displays the respective images based on the respective image data produced by the set capturing at fixed display time intervals, and the electronic camera further comprises display time interval setting means for setting the time interval.

In the sixth, seventh or eighth aspect, preferably, the image display means displays the respective images based on the respective image data produced by the set capturing at fixed display time intervals in a capturing order, and displays a next image when an instruction is given from the instructing means even before the fixed display time does not expire.

In the sixth, seventh or eighth aspect, preferably, the control means controls the electronic camera to restore a capturing enabled state after the image data has been recorded on the recording medium.

In the sixth, seventh or eighth aspect, preferably, the image display means displays a plurality of images based on the respective image data produced by the set capturing as a collection of images comprised of a plurality of smaller screen regions.

In the sixth, seventh or eighth aspect, preferably, the electronic camera further comprises set capturing display means for displaying that the set capturing is in progress.

In the sixth, seventh or eighth aspect, preferably, the image display means displays capture information during the set capturing together with or independently of the images based on the image data produced by the set capturing.

In the sixth, seventh or eighth aspect, preferably, the recording means additionally records information indicating that the image data to be recorded on the recording medium are image data captured by the set capturing, when the recording means records the image data captured by the set capturing on the recording medium.

In the sixth, seventh or eighth aspect, preferably, the image display means displays an image in an enlarged view.

An electronic camera according to a ninth aspect of the present invention comprises imaging means for optoelectrically converting a subject image to generate electronic image data, temporary storage means for temporarily storing a plurality of image data produced by the imaging means, recording means for recording the image data stored in the temporary storage means on a recording medium, image display means for displaying images based on the image data, capture instructing means for instructing a capture, set capturing indicating means for indicating a plurality of sequential captures as set capturing, and set capturing determining means for determining images captured in response to an instruction of the capture instructing means while the set capturing indicting means is being manipulated, as images in the set capturing.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a flow chart illustrating an exemplary operation in the capturing mode in Embodiment 1 of the present invention;

FIG. 4 is a flow chart illustrating an exemplary operation of card recording processing illustrated in FIG. 2;

FIG. 5 is a flow chart illustrating an exemplary operation of summary display processing illustrated in FIG. 2;

FIG. 11 is a flow chart illustrating an exemplary operation performed when a display/recording mode 2 is selected in Embodiment 2 of the present invention;

FIGS. 16A to 16C are explanatory diagrams illustrating an example of how capture information is displayed during sequential capturing or during a set capture in Embodiment 2 and Embodiment 3 of the present invention;

FIG. 17 is an explanatory diagram illustrating another example of how capture information is displayed during sequential capturing or during set capturing in Embodiment 2 and Embodiment 3 of the present invention;

FIGS. 18A to 18C are explanatory diagrams illustrating another example of how capture information is displayed during sequential capturing or during set capturing in Embodiment 2 and Embodiment 3 of the present invention;

FIG. 27 is a flow chart illustrating an exemplary operation when a display/recording mode 4 is selected in Embodiment 3A of the present invention;

DETAILED DESCRIPTION OF THE INVENTION

Embodiment 1

Figure 1:
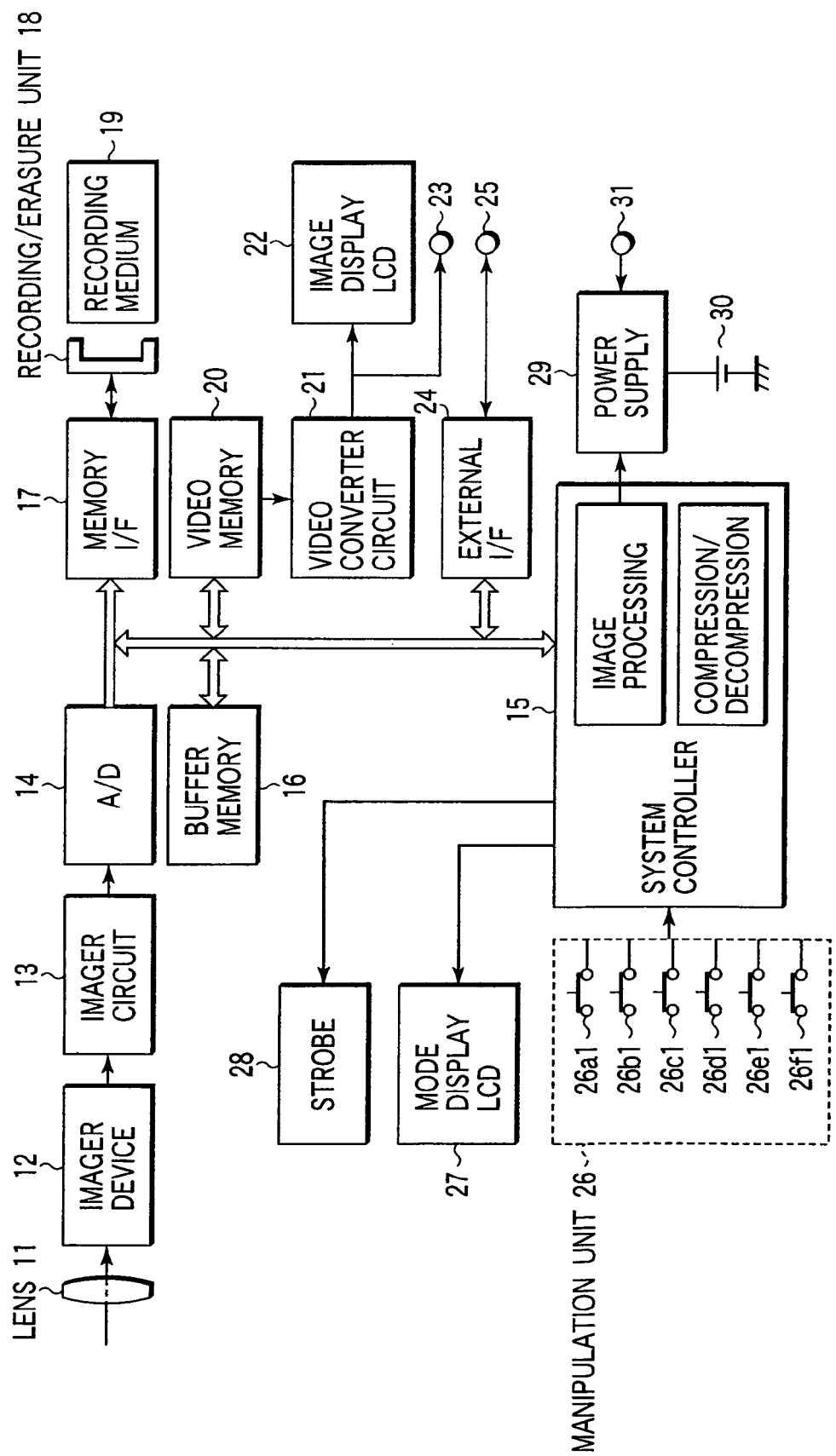
FIG. 1 is a block diagram illustrating an exemplary configuration of a system according to Embodiment 1 of the present invention.

Embodiment 1 of the present invention will hereinafter be described with reference to the accompanying drawings. FIG. 1 is a block diagram illustrating an exemplary configuration of an electronic camera according to Embodiment 1.

An imaging unit basically has a similar configuration to that of an ordinary electronic camera, and comprises a lens 11; an imager device 12 comprised of an optoelectronic converting device such as CCD; an imager circuit 13; and an A/D converter circuit 14. More specifically, an object focused by the lens 11 is optoelectrically converted by the imager device 12, and an optoelectrically converted image signal is supplied to the A/D converter circuit 14 through the imager circuit 13 to produce a digitally converted image signal.

A system controller 15, which is responsible for controlling respective units of the electronic camera, has an image processing function for performing white balance processing, matrix operations, and the like, and a compression/decompression function for compressing and decompressing image data (image information).

A buffer memory 16 temporarily stores image data and the like, produced by the imaging unit. The buffer memory 16 is also used as a work area for image processing such as the white balance processing. Further, the buffer memory 16 is used as a work area for image data compression/decompression processing, thin-out processing performed for displaying an image, and the like.

A memory interface 17 is an interface for transmitting and receiving information to and from a removable recording medium (memory card) 19 which is inserted into a card slot of a recording/erasure unit 18. Through the memory interface 17, image information is written into the recording medium 19; image information is read from the recording medium 19; and image information recorded on the recording medium 19 is erased.

A video memory 20 holds display data. Display data held in the video memory 20 is sent to a video converter circuit 21 which performs predetermined processing on the display data for displaying an image on an image display LCD 22. The image display LCD 22 is adapted to provide a summary display (a simple display) based on simple image processing in which a γ conversion is approximated by a linear line, by way of example, for the rec-view. An output signal from the video converter circuit 21 is sent to an external device through a video out terminal 23.

An external interface 24 is an interface for communicating with an external device through an external input/output terminal 25. This external interface 24 allows for transmission and reception of a variety of information such as image information to and from an external device such as a personal computer.

A manipulation unit 26, which allows the photographer to give a variety of instructions to the electronic camera, comprises a release switch 26a1; a mode selection switch 26b1 for selecting a variety of modes; a rec-view selection switch 26c1 for previously selecting whether or not the rec-view function is used; a display selection switch 26d1 for previously selecting only a summary display or a combination of a summary display with a normal display when the rec-view function is used; a cancel switch 26e1 for aborting recording of image data into a memory card or instructing erasure of image data recorded on the memory card; a display time setting switch 26f1 for setting a display time (summary display time, normal display time) in the rec-view; and the like. It should be noted that a normal display uses image data which has been gamma-converted (in software), for example, with a regular curve and recorded on the memory card and displays a reproduced image from such image data. Therefore, the normal display provides a higher image quality than a summary display.

A mode display LCD 27 displays a variety of modes, while a strobe light emitter 28 emits strobe light when an image is captured with the aid of the strobe light.

A power supply 29 supplies electric power to respective components of the electronic camera, and a battery 30 is connected to the power supply 29. The power supply 29 can also be connected to an external power supply through an external power supply terminal 31.

Next, an exemplary operation of Embodiment 1 will be described with reference to flow charts illustrated in FIGS. 2 to 7.

Figure 2:
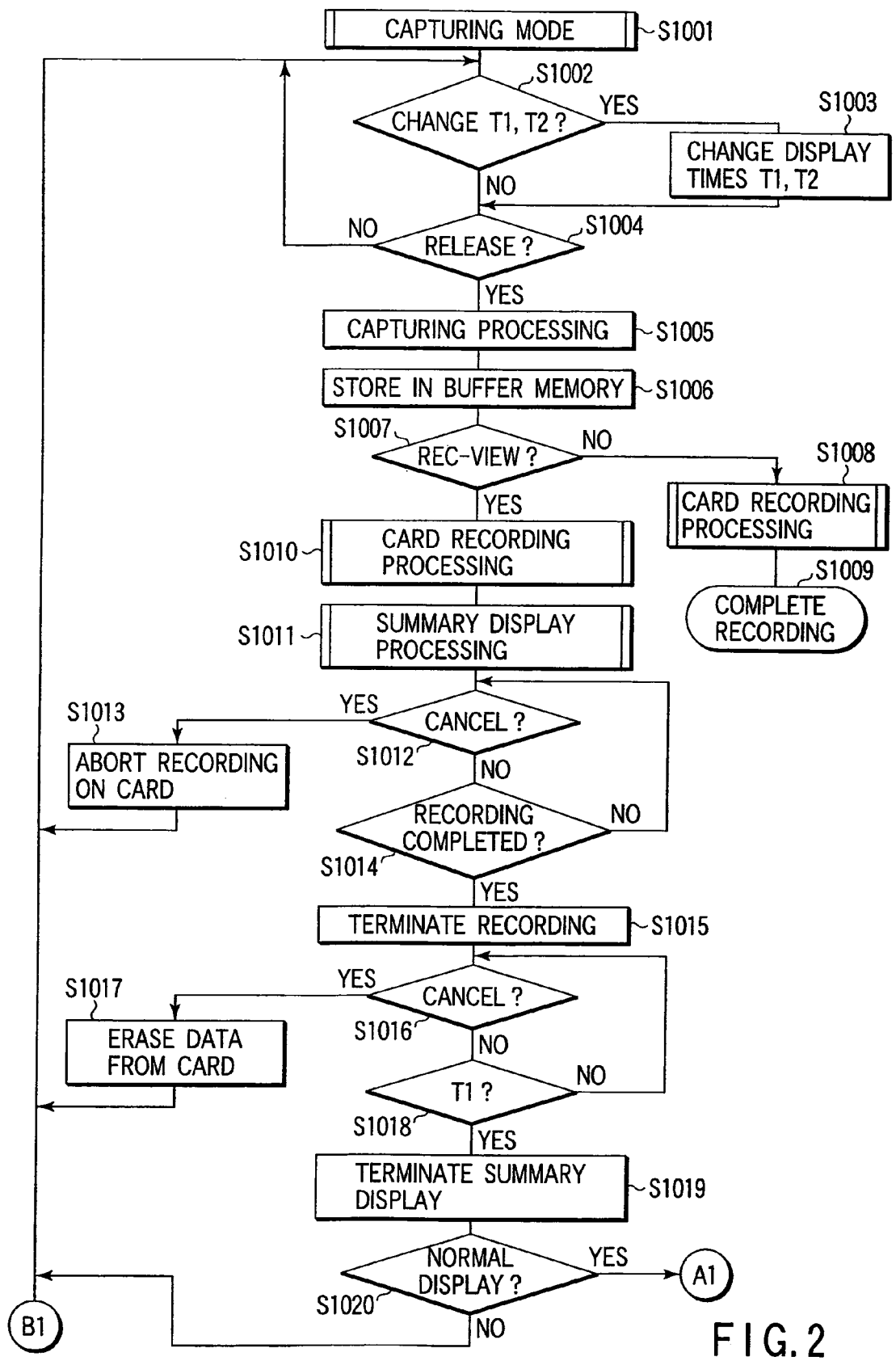
FIG. 2 is a flow chart illustrating an exemplary operation in a capturing mode in Embodiment 1 of the present invention.

First, as illustrated in FIG. 2, the following description will center on a routine executed when a capturing mode is selected through the mode selection switch 26b1 on the manipulation unit 26 illustrated in FIG. 1 (S1001).

It is first determined whether or not a change is required for a summary display time T1 in the rec-view and a normal display time T2 (S1002). When the change is required, the summary display time T1 and the normal display time T2 are changed through the display time setting switch 26f1 (S1003). When the summary display time T1 and the normal display time T2 are not changed, T1 is set to approximately three seconds; and T2 to approximately five seconds, by way of example, by default.

As the release switch 26a1 is depressed (S1004), predetermined capture processing is performed. Specifically, an image signal optoelectrically converted by the imager device 12 is input to the A/D converter circuit 14 through the imager circuit 13, and image data is output from the A/D converter circuit 14 (S1005). This image data is stored in the buffer memory 16 (S1006).

Subsequently, it is determined whether or not the rec-view function is used on the image display LCD 22. Whether or not the rec-view function is used has been previously selected through the rec-view selection switch 26c1 (S1007).

When the rec-view function is not used, card recording processing is performed (S1008). This card recording processing is performed as illustrated in a flow chart of FIG. 4. Specifically, image data stored in the buffer memory 16 undergoes image processing such as white balance processing, matrix operations, and the like (S1101), the processed image data is compressed in accordance with the JPEG scheme (S1102), and the compressed image data is recorded on the memory card (recording medium 19) through the memory interface 17 (S1103). In this way, the recording on the memory card is completed (S1009).

When the rec-view function is used, card recording processing (S1010) and summary display processing (S1011) are performed temporally in parallel. The card recording processing (S1010) is performed as illustrated in the flow chart of FIG. 4.

The summary display processing (S1011) is performed as illustrated in the flow chart of FIG. 5. First, certain image data stored in the buffer memory 16 is thinned out, so that image data produced in the imaging unit is converted to image data having a less number of data than the original image data. This thinning is performed because the number of display pixels on the image display LCD 22 is smaller than the number of pixels on the imager device 12 (S1111). The thinned image data is stored in the video memory 20 (S1112), and undergoes predetermined video processing in the video converter circuit 21 (S1113). A summary display image is displayed on the image display LCD 22 based on the signal resulting from the video processing (S1114). In this way, image data produced in the imaging unit undergoes only simple image processing without compression processing, processing involved in recording on the memory card, and the like, to display a summary image on the image display LCD 22, thereby allowing the photographer to immediately confirm a captured image.

As the cancel switch 26e1 is depressed before the recording on the memory card is completed (S1012), the recording on the memory card is aborted (S1013), and the routine again returns to step S1002. As the recording processing on the memory card is completed (S1014), recording termination processing follows (S1015).

When the cancel switch 26e1 is depressed after the recording on the memory card has been performed (S1016), image data recorded on the memory card is erased (S1017), followed by the routine again returning to step S1002. The summary display time T1 is set to be equal to or longer than a time generally required to record image data on the memory card. Therefore, when the cancel switch 26e1 is depressed after image data has been recorded on the memory card, the image data once recorded on the memory card is erased. When the cancel switch 26e1 is not depressed within the summary display time T1 (S1018), the summary display is terminated (S1019).

In this way, a captured image is confirmed as a summary display image on the image display LCD 22 and is determined by the photographer as an image not required for storage on the memory card, the photographer may depress the cancel switch 26e1 within the summary display period to readily abort recording of the image data on the memory card or erase image data recorded on the memory card. Thus, even while image data is being recorded on the memory card, or even after image data has been recorded on the memory card, the image data is not eventually recorded on the memory card if it is determined not to be recorded. It is therefore possible to eliminate useless recording on the memory card.

Next, it is determined whether or not the normal display is subsequently performed after the summary display is terminated (S1020). Whether or not the normal display is performed has been previously selected through the display selection switch 26d1. As mentioned above, since the summary display image is an image before it undergoes regular image processing, it does not always provide a satisfactory image quality from a viewpoint of the fidelity to an actually captured image. For this reason, the normal display can also be performed for a higher image quality subsequent to the summary display.

The routine returns to step 1002 when the normal display is not performed, while the processing involved in the normal display is performed as illustrated in FIG. 3 when the normal display is performed (step S1021).

Figure 6:
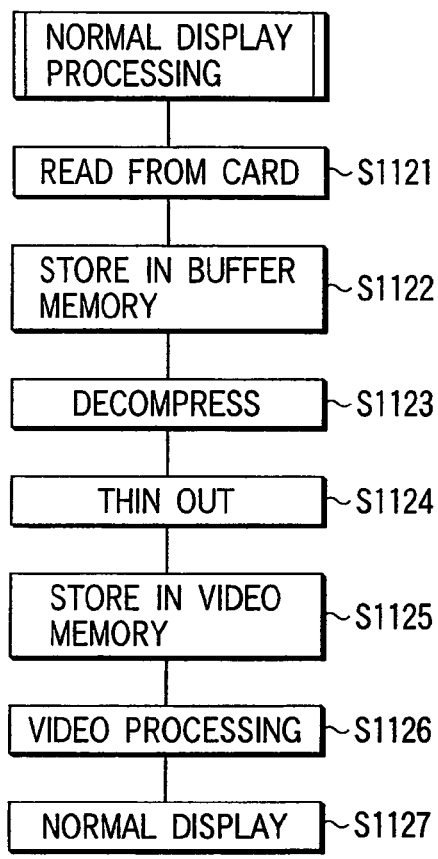
FIG. 6 is a flow chart illustrating an exemplary operation of a normal display processing illustrated in FIG. 3.

The routine for the normal display (S1021) is executed as illustrated in the flow chart of FIG. 6. First, image data recorded on the memory card (recording medium 19) through the card recording processing (S1010) is read from the memory card (S1121). The read image data is stored in the buffer memory 16 (S1122), and undergoes decompression in accordance with the JPEG scheme (S1123). The decompressed image data is thinned out as appropriate (S1124), stored in the video memory 20 (S1125), and further undergoes predetermined video processing in the video converter circuit 21 (S1126). Consequently, an image is displayed on the image display LCD 22 in the normal display mode based on the signal resulting from the video processing (S1127). By thus displaying the image in the normal display mode subsequent to the summary display, the photographer can confirm the captured image through the high quality image.

When the cancel switch 26e1 is depressed before the normal display is terminated, i.e., within the normal display time T2 (S1022), the image data once recorded on the memory card is erased (step S1023), followed by the routine again returning to step S1002. Likewise, when the release switch 26a1 is depressed before the normal display is terminated (S1024), the routine returns to step S1002. When the cancel switch 26e1 is not depressed within the normal display time T2 (S1025), the normal display is terminated (S1026), followed by the routine returning to step S1002.

In this way, since an image of a higher image quality can be viewed in the normal display mode, the necessity of recording image data on the memory card can be determined without fail even when the summary display cannot permit the photographer to determine the necessity. Then, when image data need not be recorded on the memory card, the cancel switch 26e1 may be depressed to readily erase the image data recorded on the memory card. It is therefore possible to eliminate useless recording on the memory card.

Figure 7:
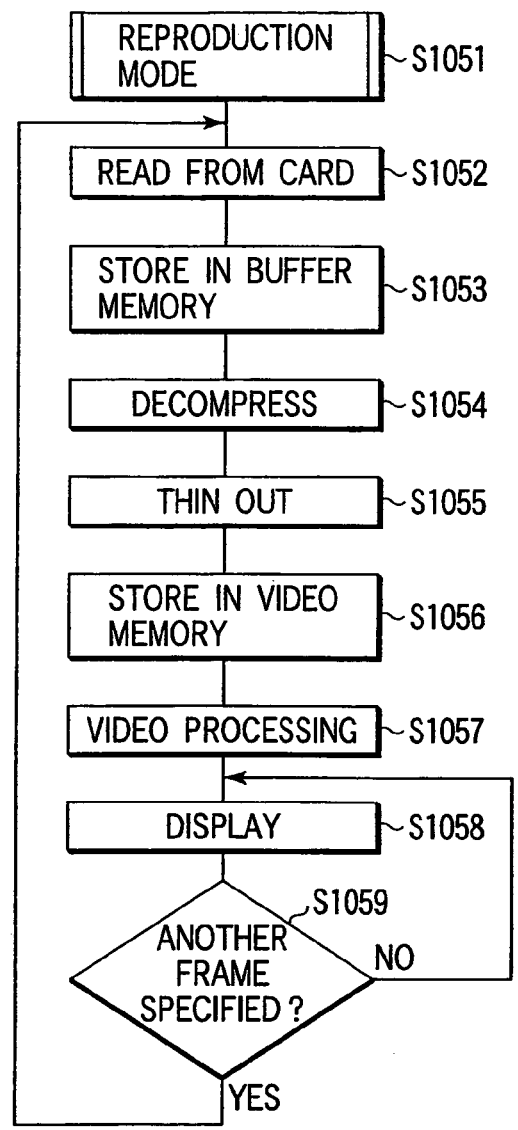
FIG. 7 is a flow chart illustrating an exemplary operation in a reproduction mode in Embodiment 1 of the present invention.

Next, as illustrated in FIG. 7, the following description will center on a routine executed when a reproduction mode is selected (S1051) through the mode selection switch 26b1 on the manipulation unit 26 illustrated in FIG. 1.

First, image data stored on the memory card (recording medium 19) is read from the memory card (S1052). The read image data is stored in the buffer memory 16 (S1053), decompressed in accordance with the JPEG scheme (S1054), and thinned out as appropriate (S1055). The thinned image data is stored in the video memory 20 (S1056), and further undergoes predetermined video processing in the video converter circuit 21 (S1057). An image is then displayed on the image display LCD 22 based on the signal resulting from the video processing (S1058). When the photographer wants to display another image (frame) (S1059), the photographer specifies such a desired frame, followed by repetitions of the foregoing steps S1052 to S1058.

According to Embodiment 1, even during or after recording image data on a recording medium, it is possible to eventually to avoid recording unnecessary image data on the recording medium, and therefore readily prevent useless recording without fail.

Embodiment 2

Figure 8:
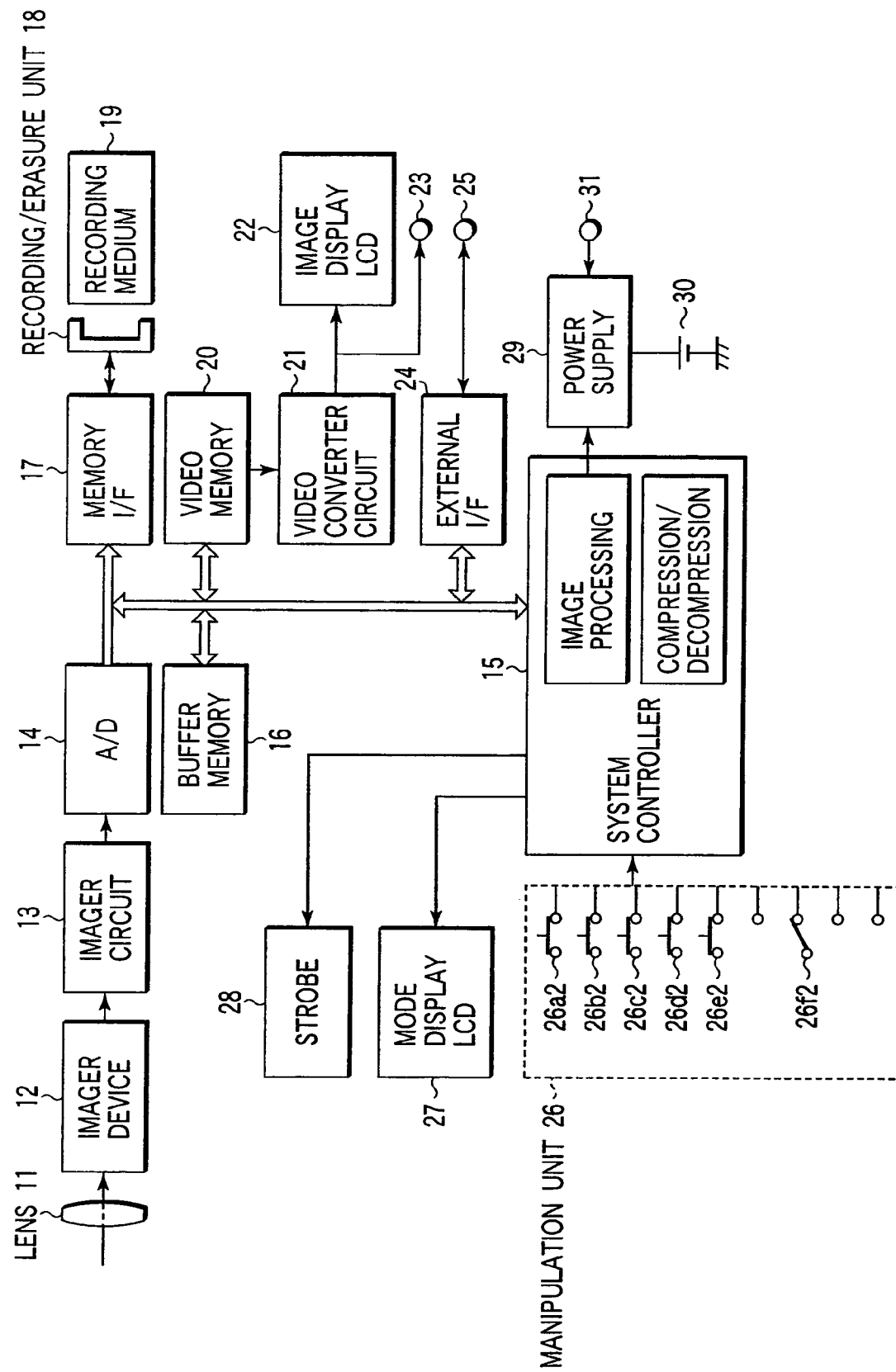
FIG. 8 is a block diagram illustrating an exemplary configuration of a system according to Embodiment 2 of the present invention.

In the following, Embodiment 2 of the present invention will be described with reference to the accompanying drawings. FIG. 8 is a block diagram illustrating an exemplary configuration of an electronic camera according to Embodiment 2.

An imaging unit basically has a similar configuration to that of an ordinary electronic camera, and comprises a lens 11; an imager device 12 comprised of an optoelectronic converting device such as CCD; an imager circuit 13; and an A/D converter circuit 14. More specifically, an object focused by the lens 11 is optoelectrically converted by the imager device 12, and an optoelectrically converted image signal is supplied to the A/D converter circuit 14 through the imager circuit 13 to produce a digitally converted image signal.

A system controller 15, which is responsible for controlling respective units of the electronic camera, has an image processing function for performing γ conversion, white balance processing, matrix operations, and the like, and a compression/decompression function for compressing and decompressing image data.

A buffer memory (DRAM) 16 temporarily stores image data (image information) and the like, produced by the imaging unit, and stores a sequence of image data resulting from sequential capturing when it is performed. The buffer memory 16 is also used as a work area for image processing such as the white balance processing. Further, the buffer memory 16 is used as a work area for image data compression/decompression processing, thin-out processing performed for displaying an image, and the like.

A memory interface 17 is an interface for transmitting and receiving information to and from a removable recording medium (memory card) 19 which is inserted into a card slot of a recording/erasure unit 18. Through the memory interface 17, image information is written into the recording medium 19; image information is read from the recording medium 19; and image information recorded on the recording medium 19 is erased.

A video memory (VRAM) 20 holds display data. Display data held in the video memory 20 is sent to a video converter circuit 21 which performs predetermined processing on the display data for displaying an image on an image display LCD 22. The image display LCD 22 is adapted to provide a summary display (simple display), based on image processing (γ conversion and the like) simpler than that for a normal display, or a multi-screen display (a multi-picture display) for the rec-view, other than the normal display. An output signal from the video converter circuit 21 is sent to an external device through a video out terminal 23.

An external interface 24 is an interface for communicating with an external device through an external input/output terminal 25. This external interface 24 allows for transmission and reception of a variety of information such as image information to and from an external device such as a personal computer.

A manipulation unit 26, which allows the photographer to give a variety of instructions to the electronic camera, comprises a release switch 26a2; a capturing mode selection switch 26b2 for selecting a variety of capturing modes (normal capturing mode, sequential capturing mode, and the like); a display/recording mode selection switch 26c2 for previously selecting a variety of modes in the rec-view and card recording after the completion of a sequential capture; an unnecessary image selection switch (cancel switch) 26d2 for selecting an image whose image data need not be recorded (preserved) on the memory card after the completion of the sequential capturing; a display time interval setting switch 26e2 for setting a time interval for sequentially displaying a sequence of images produced by the sequential capturing in the rec-view after the completion of the sequential capturing; a cross key 26f2 for performing a desired selection on the screen; and the like. It should be noted that a required image selection switch may be provided for selecting an image whose image data need be recorded on the memory card in place of the cancel switch (unnecessary image selection switch) 26d2.

A mode display LCD 27 displays a variety of modes, while a strobe light emitter 28 emits strobe light when an image is captured with the aid of the strobe light.

A power supply 29 supplies electric power to respective components of the electronic camera, and a battery 30 is connected to the power supply 29. The power supply 29 can also be connected to an external power supply through an external power supply terminal 31.

Next, an exemplary operation of Embodiment 2 will be described with reference to flow charts illustrated in FIGS. 9 to 14.

Figure 9:
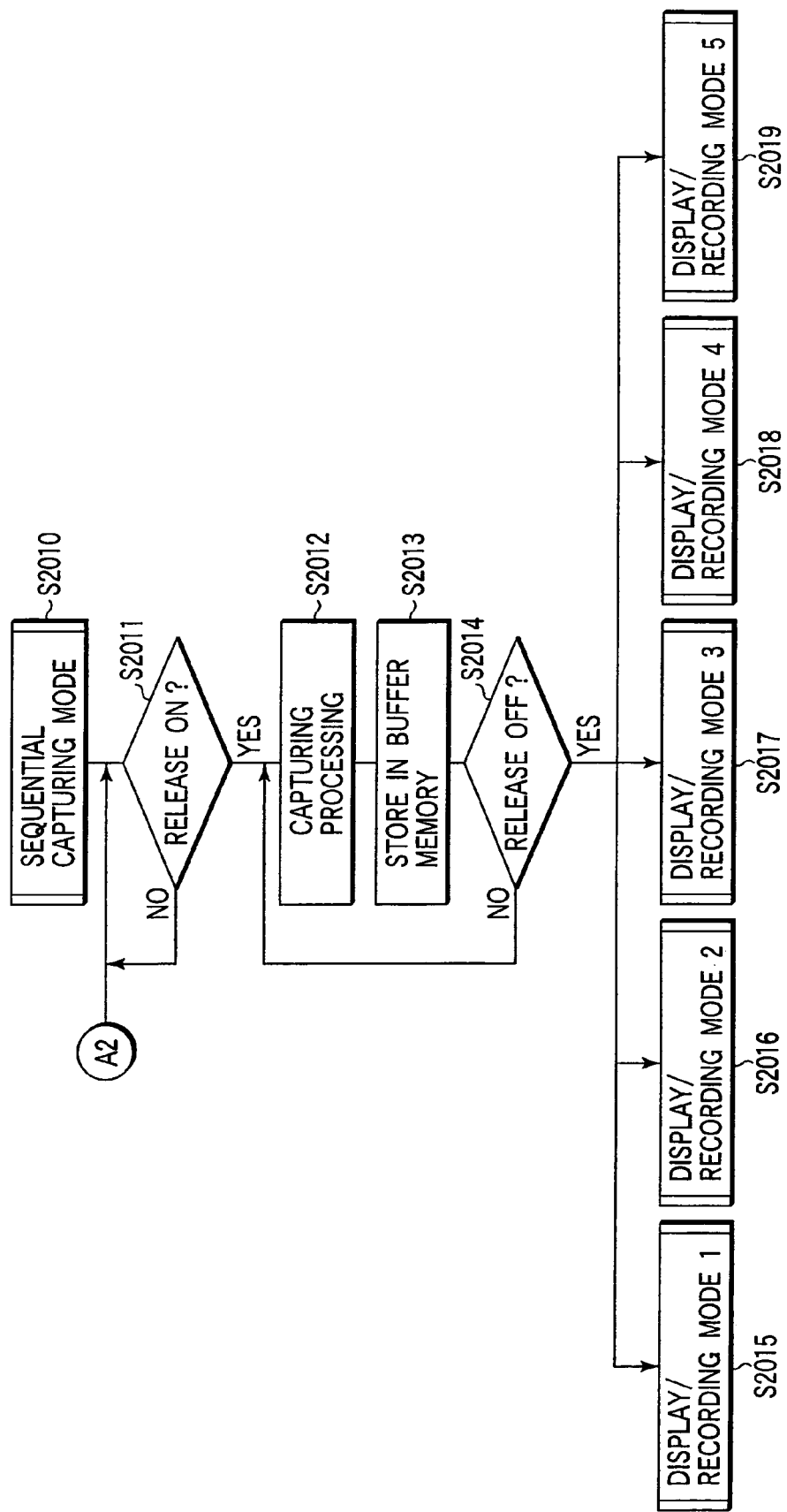
FIG. 9 is a flow chart illustrating an exemplary operation of Embodiment 2 of the present invention.

In the flow chart of FIG. 9, assume that the sequential capturing mode has been previously selected through the capturing mode selection switch 26b2 on the manipulation unit 26 (S2010). As the release switch 26a2 is turned on (S2011), predetermined capture processing is performed. Specifically, an image signal optoelectrically converted by the imager device 12 is input to the A/D converter circuit 14 through the imager circuit 13, and image data is output from the A/D converter circuit 14 (S2012). This image data is stored in the buffer memory 16 (S2013). In this way, images are sequentially captured at predetermined time intervals (the sequential capturing is performed) until the release switch 26a2 is turned off, and each image data produced in each capture is stored in the buffer memory 16 (S2014).

The completion of the sequential capturing is followed by advance to a routine associated with a display/recording mode previously selected from the five possible modes 1-5 through the display/recording mode selection switch 26c2 on the manipulation unit 26 (S2015-S2019).

Figure 10:
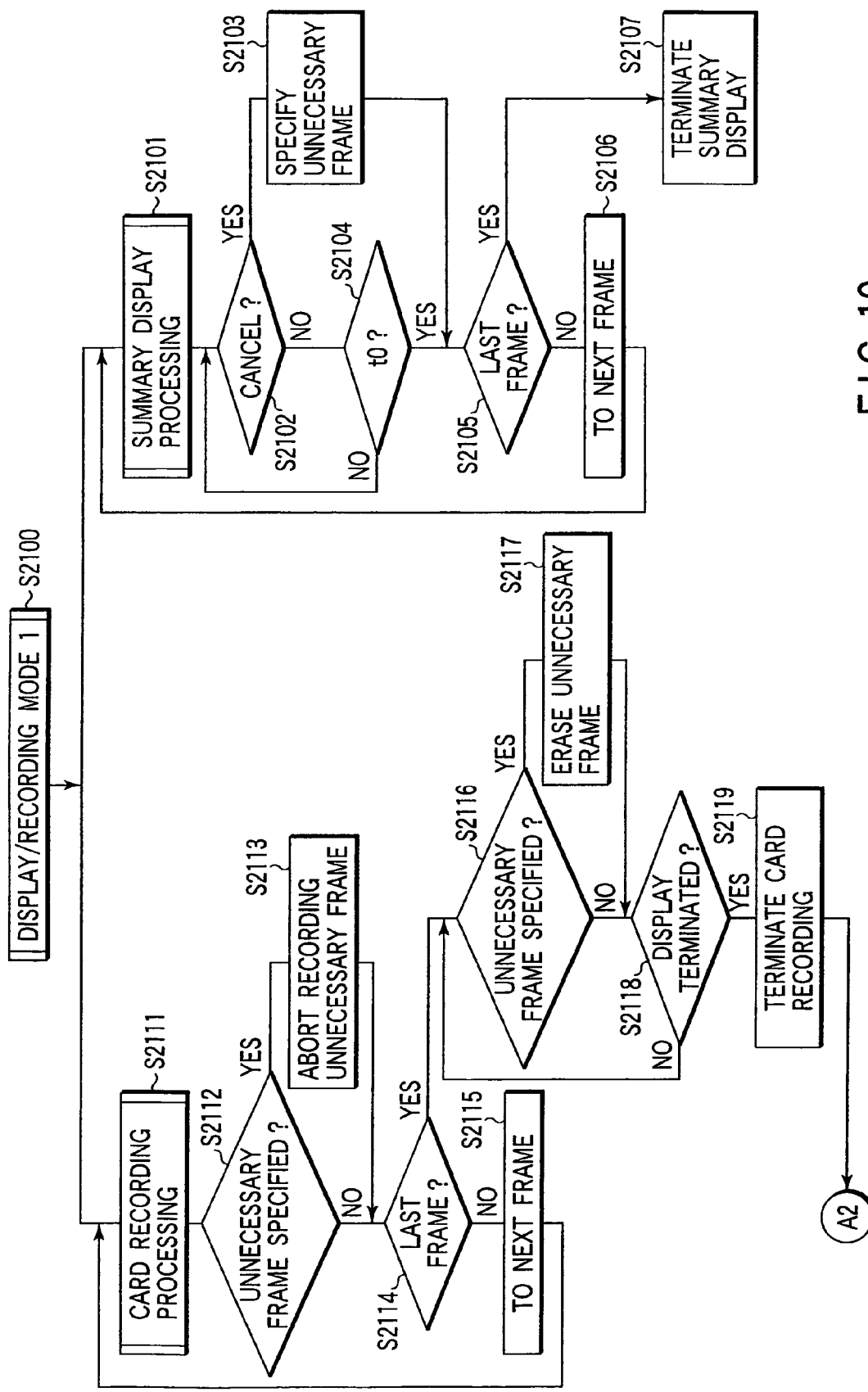
FIG. 10 is a flow chart illustrating an exemplary operation performed when a display/recording mode 1 is selected in Embodiment 2 of the present invention.

First, the following description will center on a routine executed when the display/recording mode 1 has been selected with reference to the flow chart of FIG. 10. In this display/recording mode 1 (S2100), after the sequential capturing is completed, display (rec-view) processing and card recording processing are performed temporally in parallel.

Summary display processing (S2101) displays an image which undergoes simpler image processing (γ conversion or the like) than a normal display. Specifically, image data representative of captured images stored in the buffer memory 16 undergoes summary image processing, and summary display images are displayed on the image display LCD 22 based on the processed image data.

Respective images (frames) captured by the sequential capturing are displayed sequentially on the image display LCD 22 at predetermined time intervals (in this embodiment, assume that the time interval (t0) is set to one second (t0=1)). This time interval is variable, and is previously set through the display time interval setting switch 26e2 (S2104, S2106). A photographer may view images displayed on the image display LCD 22 to determine images whose image data should be recorded (preserved) on the memory card (recording medium 19) and images whose image data should not be recorded thereon. An image which should not be recorded on the memory card, i.e., an unnecessary frames may be specified by depressing the cancel switch 26d2 while the image is being displayed on the image display LCD 22 (S2102, S2103). It should be noted that when the cancel switch 26d2 is depressed, the display proceeds to the next frame before the lapse of the display time (t0=1 second), so that a waiting time until the next frame is displayed can be omitted.

When the last frame captured by the sequential capturing has been displayed in the foregoing manner (S2105), the summary display is terminated (S2107).

Alternatively, after the last frame has been displayed, all the images may be cyclically displayed sequentially from the first frame. Additionally, for displaying each image, an image processing function of the system controller 15 may be used to zoom up so as to enlarge the displayed image at a predetermined magnification. The enlarged display allows the photographer to readily confirm the focus or the like.

In the card recording processing (S2111), image data recorded on the buffer memory 16 undergoes predetermined image processing (for example, a regular γ conversion instead of simplified γ conversion), and compression in accordance with the JPEG scheme. The compressed image data is recorded on the memory card (recording medium 19) through the memory interface 17.

Image data of respective images (frames) produced by the sequential capturing are sequentially recorded on the memory card (S2115). In this event, for recording image data of the respective images on the memory card, when image data of some frames have been marked as recording not required in the summary display processing (S2112), the image data of such frames are prevented from being recorded on the memory card (S2113). In this way, image data are sequentially processed until the last frame (S2114).

Since the summary display processing and the card recording processing are performed independently of each other and in parallel with each other, a frame, which has been recorded on the memory card, may be designated as an unnecessary frame after it has been recorded. Also, an unnecessary frame may be indicated after the last frame has been processed. For these reasons, after the last frame has been processed, it is again determined whether or not a certain frame has been designated as an unnecessary frame, and subsequently, the determination as to whether or not any frame has been designated as an unnecessary frame is continued until the summary display is completed (S2116). For frames marked as unnecessary frames, image data of these frames, which have once been recorded on the memory card, are erased, so that the image data of the frames are not eventually recorded (preserved) on the memory card (S2117). As the summary display period expires (S2118), the card recording processing is completed (S2119), followed by the routine proceeding again to a capturing enabled state (step S2011 in FIG. 9).

Additionally, for recording image data on the memory card, identification information may be recorded in combination with the image data for indicating that the image data to be recorded are image data which have been produced by the sequential capturing. Specifically, information indicative of the sequential capturing may be recorded in a header field in a file of each image data. By thus recording the identification information in combination, it is possible to collectively process the image data produced by the sequential capturing.

Next, the following description will center on a routine executed when the display/recording mode 2 has been selected with reference to the flow chart of FIG. 11. Likewise, in this display/recording mode 2 (S2200), after the sequential capturing is completed, the display (rec-view) processing and the card recording processing are performed temporally in parallel.

Figure 15:
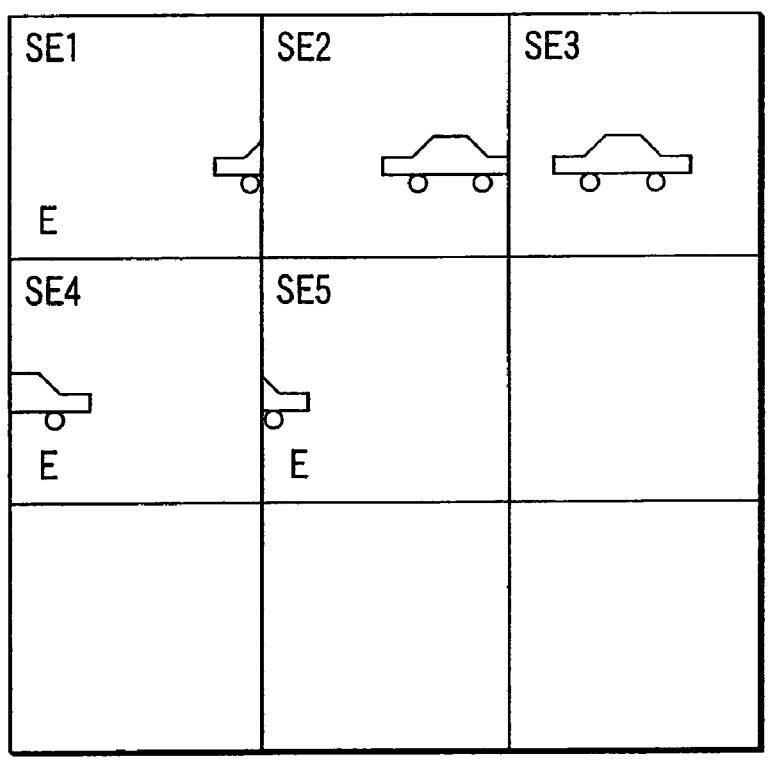
FIG. 15 is an explanatory diagram illustrating an exemplary multi-screen display when the display/recording mode 2 or the display/recording mode 4 is selected in Embodiment 2 and Embodiment 3 of the present invention.

Multi-screen display processing (S2201) reduces the size of a plurality of images captured by sequential capturing and displays the images in a reduced size on a single screen as a collection of images, i.e., a multi-screen display. Specifically, image data stored in the buffer memory 16 undergoes the processing required for the multi-screen display, and for example, as illustrated in FIG. 15, a plurality of frames of images captured by the sequential capturing are provided on the image display LCD 22 as the multi-screen display.

The photographer may view the multi-screen display on the image display LCD 22 to determine images which should be recorded on the memory card (recording medium 19) and images which should not be recorded. An image which should not be recorded on the memory card, i.e., an unnecessary frame may be selected using the cross key 26f2 or the like. In the example of FIG. 15, a mark "E" is displayed in a lower left region of an image selected from the respective images (labeled sequential capturing frame numbers SE1-SE5) captured by the sequential capturing (S2202). By thus selecting an unnecessary frame on the screen and then depressing the cancel switch 26d2, the unnecessary frame can be designated (S2203, S2204). The designation of an unnecessary frame can be accepted as long as the multiple images are being displayed on the screen (S2205). As the display period expires, the multi-screen display is terminated (S2206).

Operations at respective steps (S2211-S2219) in the card recording processing are similar to those at the corresponding steps (S2111-S2119) in the display/recording mode 1 illustrated in FIG. 10. Specifically, image data of respective frames captured by sequential capturing are sequentially recorded on the memory card. However, for those frames which have been designated as recording not required during the summary display processing, the recording of the image data on the memory card is aborted, or the image data once recorded on the memory card is erased.

In this way, since captured images are displayed after the completion of the sequential capturing in the display/recording modes 1 and 2, unnecessary images can be readily confirmed. Particularly, the display/recording mode 1 is advantageous in providing a wider display area for one image, which facilitates the viewing, since every image is displayed over the entire screen through the summary display. The display/recording mode 2 in turn is advantageous in facilitating a comparison among respective images since these images produced by the sequential capturing are simultaneously displayed through the multi-screen display.

Also, since the display/recording modes 1 and 2 can terminate the card recording processing in a shorter period of time since the display processing and the card recording processing are performed temporally in parallel. Further, unnecessary images may be selectively designated during the display period to readily abort recording of image data on the memory card or erase image data once recorded on the memory card, thereby making it possible to avoid useless recording of such unnecessary images on the memory card.

Figure 12:
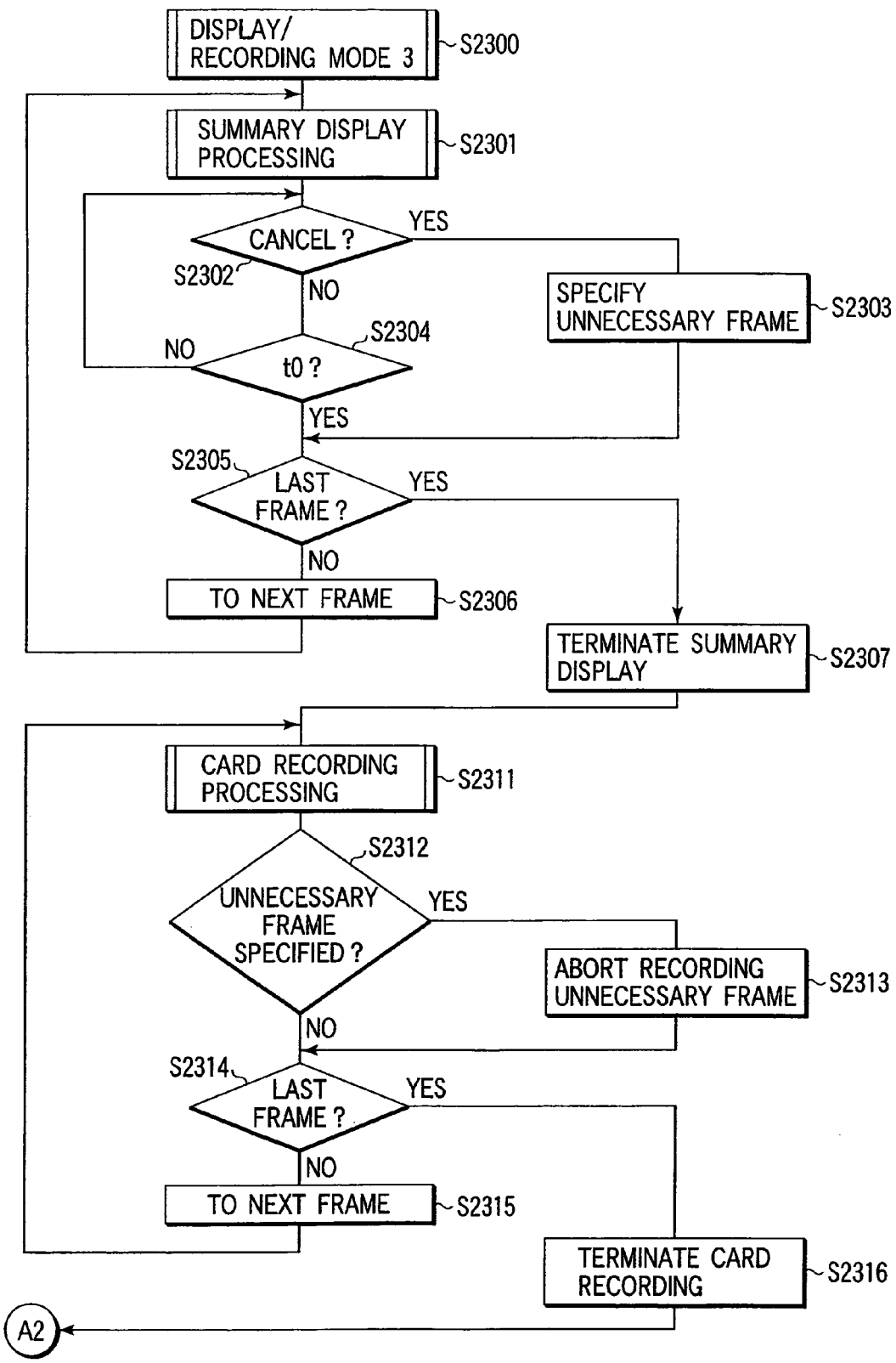
FIG. 12 is a flow chart illustrating an exemplary operation performed when a display/recording mode 3 is selected in Embodiment 2 of the present invention.

Next, the following description will center on a routine executed when the display/recording mode 3 has been selected with reference to the flow chart of FIG. 12. In this display/recording mode 3 (S2300), the display (rec-view) processing is performed after sequential capturing is completed, and the card recording processing is performed after the display processing.

Operations at respective steps (S2301-S2307) in the summary display processing are similar to those at the corresponding steps (S2101-S2107) in the display/recording mode 1 illustrated in FIG. 10. Specifically, respective images (frames) captured by sequential capturing are sequentially displayed on the image display LCD 22 at predetermined time intervals, and the cancel switch 26d2 is depressed to designate an unnecessary frame while the image is being displayed on the image display LCD 22.

Likewise, operations at S2311 to S2315 involved in the card recording processing are similar to those at the corresponding steps S2111-S2115 illustrated in FIG. 10. However, in the display/recording mode 3, since the card recording processing is performed after the summary display processing is completed, unnecessary frames have already been designated (S2302, S2303) at the time the card recording processing is started. For this reason, steps S2116 to S2118 illustrated in FIG. 10 are omitted. Therefore, in the display/recording mode 3, the processing completed for the last frame results in the termination of the recording of image data on the memory card (S2316).

Figure 13:
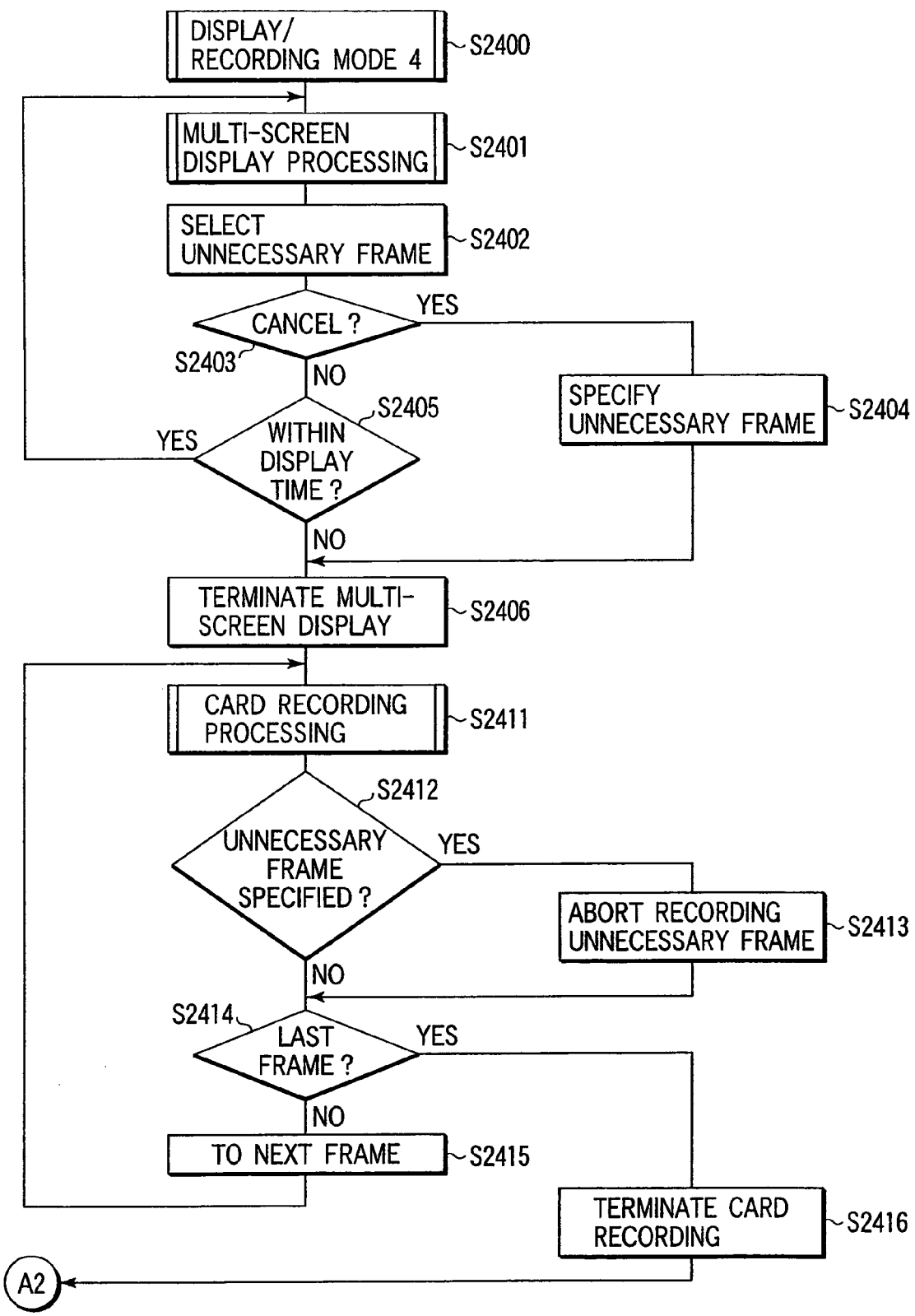
FIG. 13 is a flow chart illustrating an exemplary operation performed when a display/recording mode 4 is selected in Embodiment 2 of the present invention.

Next, the following description will center on a routine executed when the display/recording mode 4 has been selected with reference to the flow chart of FIG. 13. Likewise, in this display/recording mode 4 (S2400), the display (rec-view) processing is performed after sequential capturing is completed, and the card recording processing is performed after the display processing. Also, in the display processing, images are viewed in a multi-screen display.

Operations at respective steps (S2401-S2406) in the multi-screen display processing are similar to those at the corresponding steps (S2201-S2206) of the display/recording mode 2 illustrated in FIG. 11. Specifically, any unnecessary frame is selected on the multi-image screen, and the cancel switch 26d2 is then depressed to designate the unnecessary frame.

Likewise, operations at steps S2411 to S2415 in the card recording processing are similar to those at the corresponding steps S2211 to S2215 illustrated in FIG. 11. However, in the display/recording mode 4, since the card recording processing is performed after the multi-screen display processing is completed, the steps S2216 to S2218 illustrated in FIG. 11 are omitted, the processing completed for the last frame results in the termination of the recording of image data on the memory card (S2416).

As described above, in the display/recording modes 3 and 4, since captured images are displayed after the sequential capturing is completed, unnecessary images can be readily determined as is the case of the display/recording modes 1 and 2.

Figure 14:
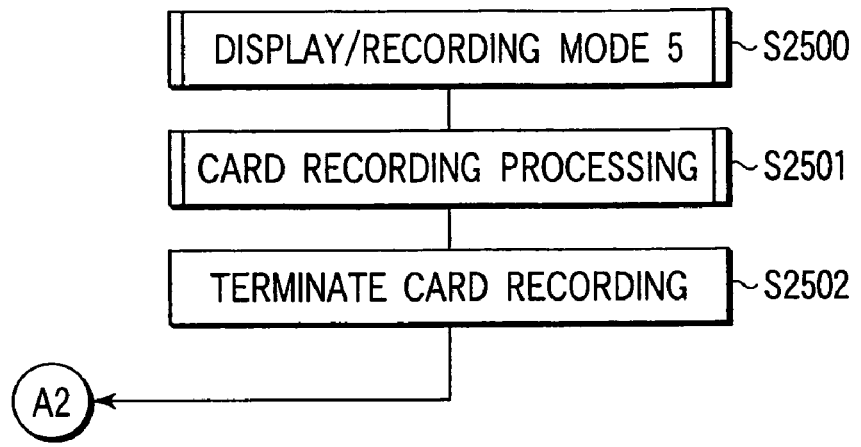
FIG. 14 is a flow chart illustrating an exemplary operation performed when a display/recording mode 5 is selected in Embodiment 2 of the present invention.

Next, the following description will center on a routine executed when the display/recording mode 5 has been selected with reference to the flow chart of FIG. 14.

In this display/recording mode 5 (S2500), no image is displayed, so that the card recording processing is immediately entered after sequential capturing is completed (S2501). As image data of respective images captured by the sequential capture are recorded on the memory card, the card recording is completed (S2502), followed by the routine proceeding again to a capturing enabled state (step S2011 in FIG. 9).

In the examples described above, while images captured by the sequential capturing are displayed on the image display LCD 22, capture information during the sequential capturing may be displayed in combination with or independently of the images captured by the sequential capturing. In the following, description will be made on some examples in which such capture information is displayed with reference to FIGS. 16 to 18.

In examples illustrated in FIGS. 16A to 16C, luminance information on each of images captured by sequential capturing (three images in this example) is displayed on the image display LCD 22.

FIG. 16A to FIG. 16C show luminance distributions for respective images captured by the sequential capturing. The horizontal axis represents the luminance of pixels included in a measuring area of AE, while the vertical axis represents the frequency of occurrence of each luminance. The measuring area may be the entire screen.

When sequential capturing is performed with exposure conditions intentionally varied to only record the one which exhibits the best result on the memory card, a sufficient evaluation may not be made only by displaying images. However, a correct evaluation can be made by displaying the luminance information as shown in this example.

Another example shown in FIG. 17 displays a variety of capture information on each of images captured by the sequential capturing (three images in this example) represented by numerical values on the image display LCD 22.

A line "recording memory" displays the capacity of memory required for recording each of the images (NO1-NO3) on the memory card. A line "AF" displays numerical values representative of AF evaluation amounts for each capture (100 is a maximum value, and the focus is more accurate as the value is larger). A line "AE" displays a shutter speed and an aperture value for each capture. A line "GV" displays the amount of strobe light emission for each capture, when strobe light is used for the capture, converted to a guide number.

For example, when sequential capturing is performed with the focus intentionally varied to record only the one which exhibits the best result on the memory card, a sufficient evaluation may not be made only by displaying images. However, a correct evaluation can be made by displaying the numerical information as shown in this example.

A further example illustrated in FIGS. 18A to 18C displays a focused area in each of images captured by the sequential capturing (three images in this example) on the image display LCD 22 in an identifiable manner.

For example, a portion of an image having a spatial frequency equal to or higher than a fixed value is determined to be in focus, and this portion is displayed in an identifiable manner. This can be implemented using such methods as displaying only a focused area in a special color or in half tone, and the like. The examples illustrated in FIGS. 18A to 18C show (A) a person on the left side, standing behind, is focused; (B) a person in a central portion, standing in front, is focused; and (C) either of persons is not focused. The focused areas are displayed with an emphasized red component.

By thus displaying the capture information during the sequential capturing on the screen, a correct evaluation can be accomplished even when the evaluation is difficult with a captured image. It is therefore possible to readily select those images which need be recorded on the memory card or those images which need not be recorded on the memory card.

According to Embodiment 2, since captured images are displayed after the sequential capturing is completed, it is possible to readily distinguish images which need be recorded (preserved) on a recording medium from images which need not be recorded, with the result that image data of the images which need be recorded on the recording medium can only be recorded readily on the recording medium.

Embodiment 3

In the following, Embodiment 3 of the present invention will be described with reference to the accompanying drawings.

Embodiment 3A

Figure 19:
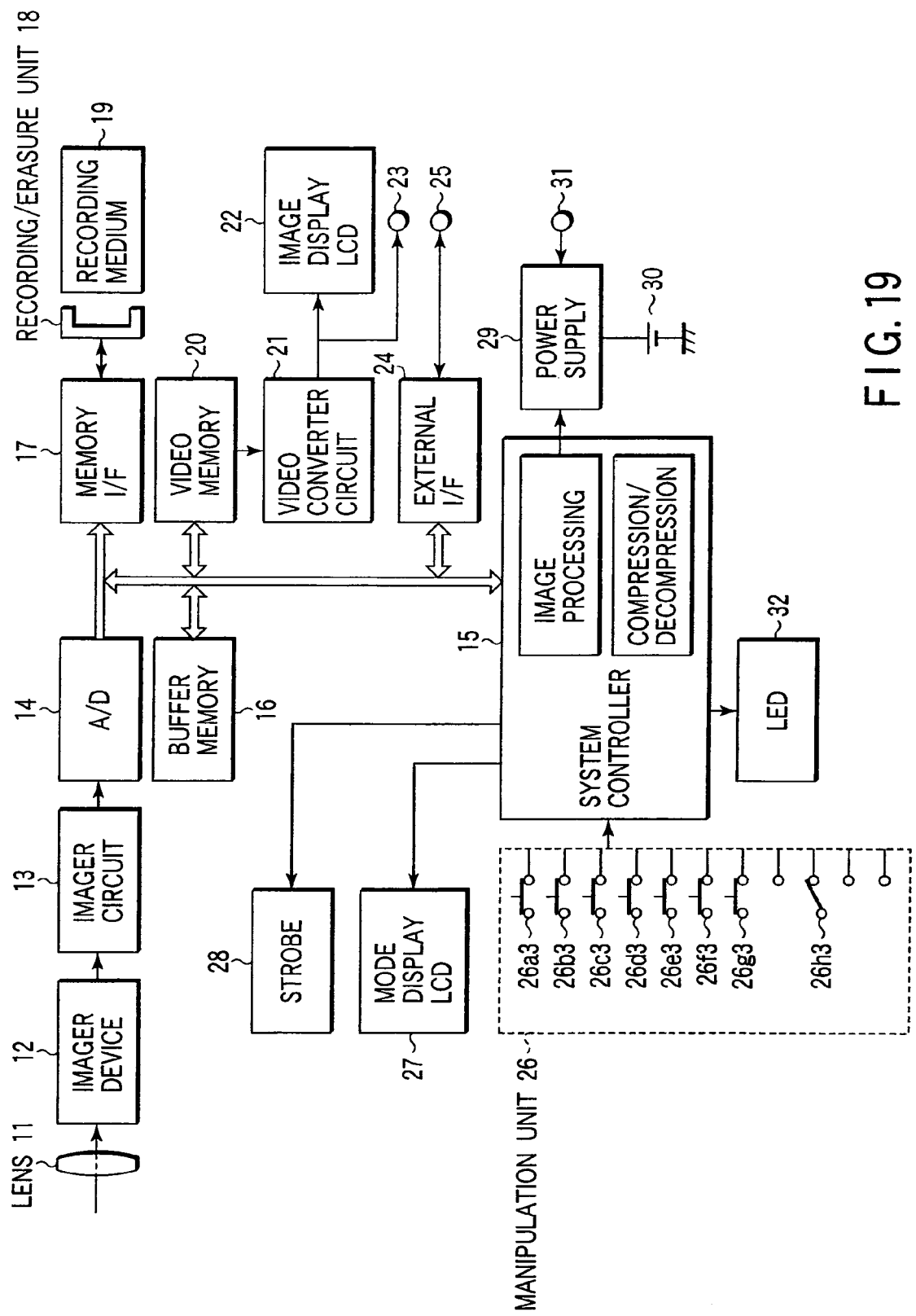
FIG. 19 is a block diagram illustrating an exemplary configuration of a system according to Embodiment 3 of the present invention.

FIG. 19 is a block diagram illustrating an exemplary configuration of an electronic camera according to Embodiment 3A.

An imaging unit basically has a similar configuration to that of an ordinary electronic camera, and comprises a lens 11; an imager device 12 comprised of an optoelectronic converting device such as CCD; an imager circuit 13; and an A/D converter circuit 14. More specifically, an object focused by the lens 11 is optoelectrically converted by the imager device 12, and an optoelectrically converted image signal is supplied to the A/D converter circuit 14 through the imager circuit 13 to produce a digitally converted image signal.

A system controller 15, which is responsible for controlling respective units of the electronic camera, has an image processing function for performing γ conversion, white balance processing, matrix operations, and the like, and a compression/decompression function for compressing and decompressing image data (image information). The system controller also has determining functions for determining whether a sequence of continuous captures by quick capturing or the like (set capturing) is regarded as set capturing (a set capturing start determining function and a set capturing end determining function).

A buffer memory (DRAM) 16 temporarily stores image data and the like, produced by the imaging unit, and stores a sequence of image data resulting from set capturing when it is performed. The buffer memory 16 is also used as a work area for image processing such as the white balance processing. Further, the buffer memory 16 is used as a work area for image data compression/decompression processing, thin-out processing performed for displaying an image, and the like.

A memory interface 17 is an interface for transmitting and receiving information to and from a removable recording medium (memory card) 19 which is inserted into a card slot of a recording/erasure unit 18. Through the memory interface 17, image information is written into the recording medium 19; image information is read from the recording medium 19; and image information recorded on the recording medium 19 is erased.

A video memory (VRAM) 20 holds display data. Display data held in the video memory 20 is sent to a video converter circuit 21 which performs predetermined processing on the display data for displaying an image on an image display LCD 22. The image display LCD 22 is adapted to provide a summary display, which involves image processing (y conversion and the like) simpler than that for a normal display, or a multi-screen display for the rec-view, other than the normal display. An output signal from the video converter circuit 21 is sent to an external device through a video out terminal 23.

An external interface 24 is an interface for communicating with an external device through an external input/output terminal 25. This external interface 24 allows for transmission and reception of a variety of information such as image information to and from an external device such as a personal computer.

A manipulation unit 26, which allows the photographer to give a variety of instructions to the electronic camera, comprises a release switch 26a3; a capturing mode selection switch 26b3 for selecting a variety of capturing modes (normal capturing mode, sequential capturing mode, and the like); a display/recording mode selection switch 26c3 for previously selecting a variety of modes in the rec-view and card recording after the completion of capturing; an unnecessary image selection switch (cancel switch) 26d3 for selecting an image whose image data need not be recorded (preserved) on the memory card after the completion of the capturing; display time interval setting switch 26e3 for setting a time interval for sequentially displaying a sequence of images captured by set capturing in the rec-view after the completion of the capturing; a time setting switch 26f3 for setting a time when the start or end of the set capturing is determined by a time interval of release manipulations or the like; a mark-off switch 26g3 for use in determining the start or end of the set capturing through an indication entered by the photographer (hereinafter referred to as the "mark off entry"); a cross key 26h3 for performing a desired selection on the screen; and the like. It should be noted that a required image selection switch may be provided for selecting an image whose image data need be recorded on the memory card in place of the cancel switch (unnecessary image selection switch) 26d3.

A mode display LCD 27 displays a variety of modes, while a strobe light emitter 28 emits strobe light when an image is captured with the aid of the strobe light. An LED display 32 indicates the set capturing in progress.

A power supply 29 supplies electric power to respective components of the electronic camera, and a battery 30 is connected to the power supply 29. The power supply 29 can also be connected to an external power supply through an external power supply terminal 31.

Next, an exemplary operation of Embodiment 3A will be described with reference to flow charts illustrated in FIG. 20 and the like.

Figure 20:
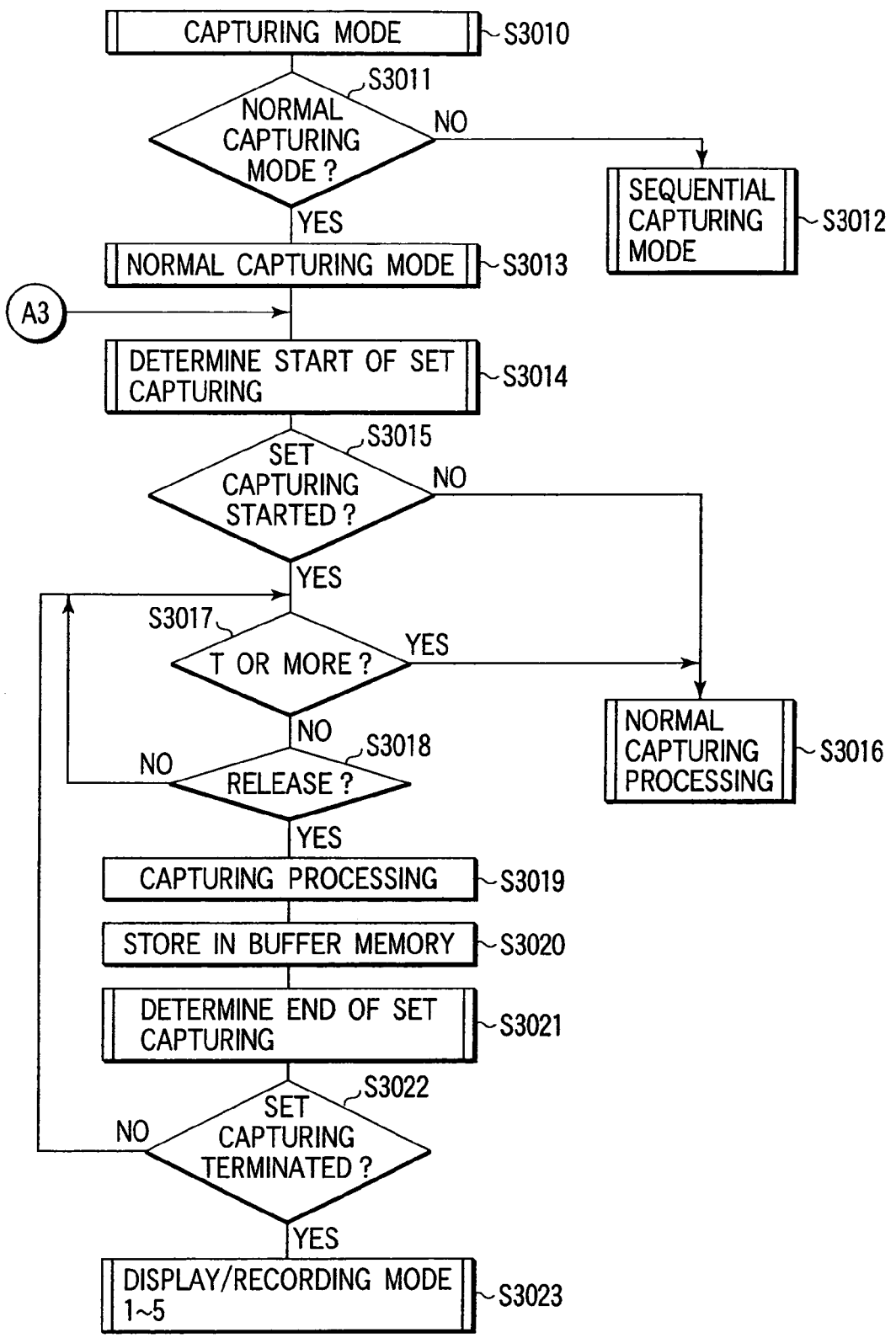
FIG. 20 is a flow chart illustrating an exemplary operation of Embodiment 3A of the present invention.

In the flow chart of FIG. 20, assume that a desired capturing mode has been selected through the capturing mode selection switch 26b3 on the manipulation unit 26 (S3010). First, a capturing mode is identified (S3011), and when a sequential capturing mode is identified, predetermined sequential capturing processing is performed (S3012).

For a normal capturing mode (S3013), it is determined whether or not set capturing is started (S3014, S3015). If it is determined that no set capturing is performed, normal capturing processing is performed (S3016). Also, even if the set capturing is determined, a failure in manipulating the release switch for a fixed period of time T (for example one minute) or more (S3017, S3018) results in forcedly resetting of the set capturing, followed by the routine proceeding to the normal capturing processing (S3016).

In the set capturing, each time the release switch 26a3 is depressed, predetermined imaging processing is performed (S3019) to sequentially store image data produced by respective captures in the buffer memory (S3020). A period of the set capturing continues until it is determined that the set capturing is completed (S3022) by determining the end of the set capturing (S3021). Also, during the set capturing period, the LED display 32 indicates that the set capturing is in progress.

Here, the set capturing start determination and end determination will be described with reference to FIGS. 21 and 22.

Figure 21A:
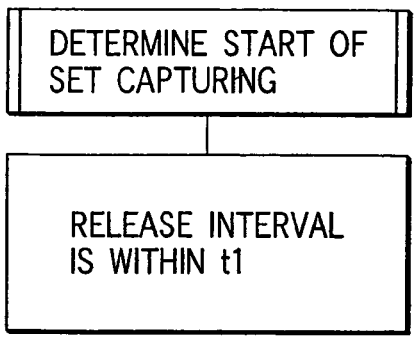
FIGS. 21A and 21B are diagrams showing how to determine that set capturing is started in Embodiment 3A of the present invention.
Figure 21B:
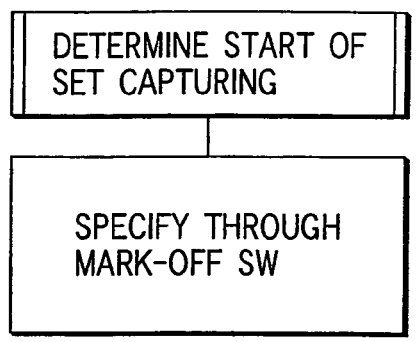

The set capturing start determination may be made as shown in FIG. 21A or 21B. In an example of FIG. 21A, the start of the set capturing is determined when a release interval, i.e., a time interval of sequential captures is within a predetermined time interval t1, and it is determined that the set capturing has been started from the preceding capture. In an example of FIG. 21B, the start of set capturing is determined when the photographer instructs the start through an associated manipulation. The manipulation for instructing the start involves depressing the mark-off switch 26g3, and it is determined that the set capturing is started from a capture after the manipulation for instructing the start.

Figure 22A:
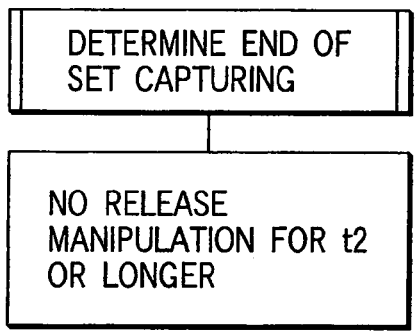
FIGS. 22A and 22B are diagrams showing how to determine that the set capturing is terminated in Embodiment 3A of the present invention.
Figure 22B:
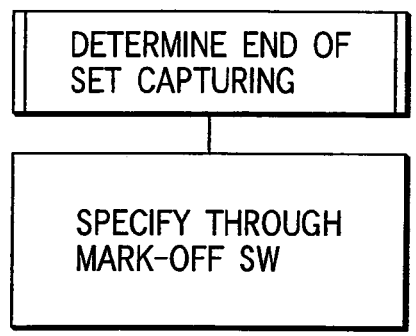

The set capturing end determination may be made as shown in FIG. 22A or 22B. In an example of FIG. 22A, the end of the set capturing is determined when the release switch has not been depressed for a predetermined period of time t2 or longer. In an example of FIG. 22B, the end of the set capturing is determined when the photographer instructs the end through an associated manipulation. The manipulation for instructing the end involves depressing the mark-off switch 26g3.

In the examples of FIGS. 21A and 22A, the set time interval t1 and the set period of time t2 are variable, and they can be previously set through the time setting switch 26f3 or the like. Specifically, t1, t2 can be set in the following manner. As the time setting switch 26f3 is depressed to enter a time setting mode, candidates for the set time interval t1 (for example one second, two seconds, five seconds) and candidates for the set period of time t2 (for example, two seconds, five seconds, ten seconds) are displayed on the image display LCD 22. These set time interval t1 and set period of time t2 can be selected through the cross key 26h3, and established by depressing the release switch 26a3 after desired values are selected through the cross key 26h3. The time setting mode is cleared by again depressing the time setting switch 26f3. Default values are set at two seconds for the set time interval t1 (t1=2) and at five seconds for the set period of time t2 (t2=5).

Figure 23:
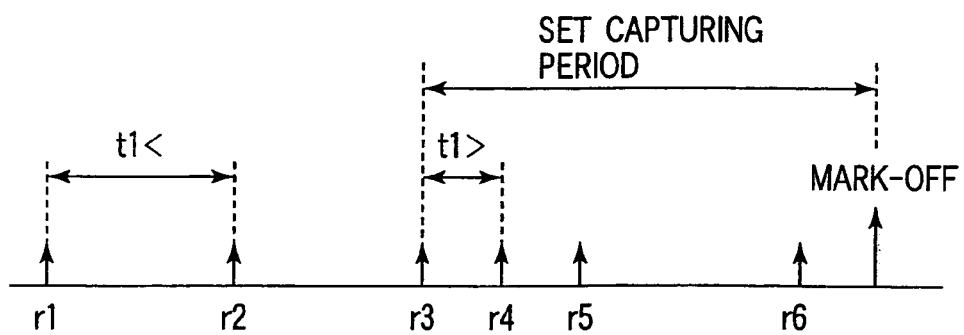
FIG. 23 is a diagram schematically showing how to determine that the set capturing is started and terminated in Embodiment 3A of the present invention.

FIG. 23 shows an example of the foregoing start and end determinations, wherein the start is determined with the method of FIG. 21A and the end is determined with the method of FIG. 22B. In FIG. 23, r1-r6 indicate manipulations on the release switch 26a3, respectively. Since a time interval between r1 and r2 is longer than t1, the start of set capturing is not determined. On the other hand, since a time interval between r3 and r4 is shorter than t1, the start of set capturing is determined at the time of r4, so that the processing proceeds on the assumption that the set capturing has been started from the time r3. In this example, once the set capturing is started, a set capturing period continues even if a release interval is longer than t1, and the set capturing period is terminated by the photographer depressing the mark-off switch 26g3.

In the flow chart of FIG. 20, as the set capturing is terminated (S3022), the flow proceeds to a routine associated with a display/recording mode previously selected from the five possible modes 1-5 through the display/recording mode selection switch 26c3 on the manipulation unit 26 (S3023).

Figure 24:
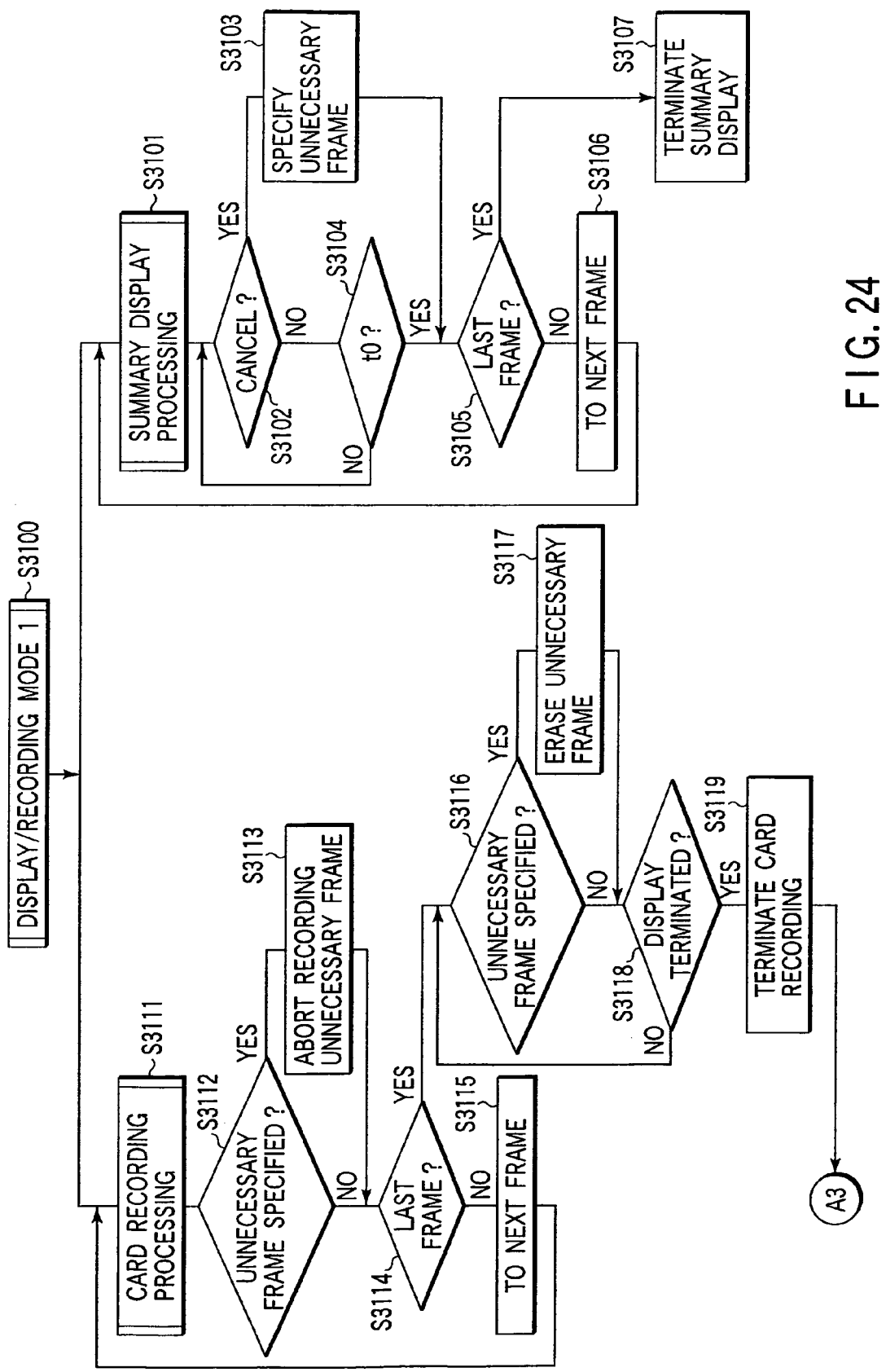
FIG. 24 is a flow chart illustrating an exemplary operation when a display/recording mode 1 is selected in Embodiment 3A of the present invention.

First, the following description will center on a routine executed when the display/recording mode 1 has been selected with reference to a flow chart of FIG. 24. In this display/recording mode 1 (S3100), after the sequential capturing is completed, display (rec-view) processing and card recording processing are performed temporally in parallel.

Summary display processing (S3101) displays an image which undergoes simpler image processing (γ conversion or the like) than a normal display. Specifically, image data representative of captured images stored in the buffer memory 16 undergoes summary image processing, and summary display images are displayed on the image display LCD 22 based on the processed image data.

Respective images (frames) captured by the set capturing are displayed sequentially on the image display LCD 22 at predetermined time intervals (in this embodiment, assume that the time interval (t0) is one second (t0=1)). This time interval is variable, and is previously set through the display time interval setting switch 26e3 (S3104, S3106). A photographer may view images displayed on the image display LCD 22 to determine images whose image data should be recorded (preserved) on the memory card (recording medium 19) and images whose image data should not be recorded thereon. The images which should not be recorded on the memory card, i.e., unnecessary frames may be specified by depressing the cancel switch 26d3 while the image are being displayed on the image display LCD 22 (S3102, S3103). It should be noted that when the cancel switch 26d3 is depressed, the display proceeds to the next frame before the lapse of the display time (t0=1 second), so that a waiting time until the next frame is displayed can be omitted.

When the last frame captured by the set capturing has been displayed in the foregoing manner (S3105), the summary display is terminated (S3107).

Alternatively, after the last frame has been displayed, all the images may be cyclically displayed sequentially from the first frame. Additionally, for displaying each image, an image processing function of the system controller 15 may be used to zoom up and enlarge the displayed image at a predetermined magnification. The enlarged display allows the photographer to facilitate the confirmation of the focus or the like.

In the card recording processing (S3111), image data recorded on the buffer memory 16 undergoes predetermined image processing (for example, a regular γ conversion instead of simplified γ conversion), and compression in accordance with the JPEG scheme. The compressed image data is recorded on the memory card (recording medium 19) through the memory interface 17.

Image data of respective images (frames) produced by the set capturing are sequentially recorded on the memory card (S3115). In this event, for recording image data of the respective images on the memory card, when image data of some frames have been marked as recording not required in the summary display processing (S3112), the image data of such frames are prevented from being recorded on the memory card (S3113). In this way, image data are sequentially processed until the last frame (S3114).

Since the summary display processing and the card recording processing are performed independently of each other and in parallel with each other, a frame, which has been recorded on the memory card, may be designated as an unnecessary frame after it has been recorded. Also, unnecessary frame may be indicated after the last frame has been processed. For these reasons, after the last frame has been processed, it is again determined whether or not a certain frame has been designated as an unnecessary frame, and subsequently, the determination as to whether or not any frame has been designated as an unnecessary frame is continued until the summary display is completed (S3116). For frames marked as unnecessary frames, image data of these frames, which have once been recorded on the memory card, are erased, so that the image data of the frames are not eventually recorded (preserved) on the memory card (S3117). As the summary display period expires (S3118), the card recording processing is completed (S3119), followed by the routine proceeding again to a capturing enabled state (step S3014 in FIG. 20).

Additionally, for recording image data on the memory card, identification information may be recorded in combination with the image data for indicating that the image data to be recorded are image data which have been produced by set capturing. Specifically, information indicative of the set capturing may be recorded in a header field in a file of each image data. By thus recording the identification information in combination, it is possible to collectively process the image data produced by the set capturing.

Figure 25:
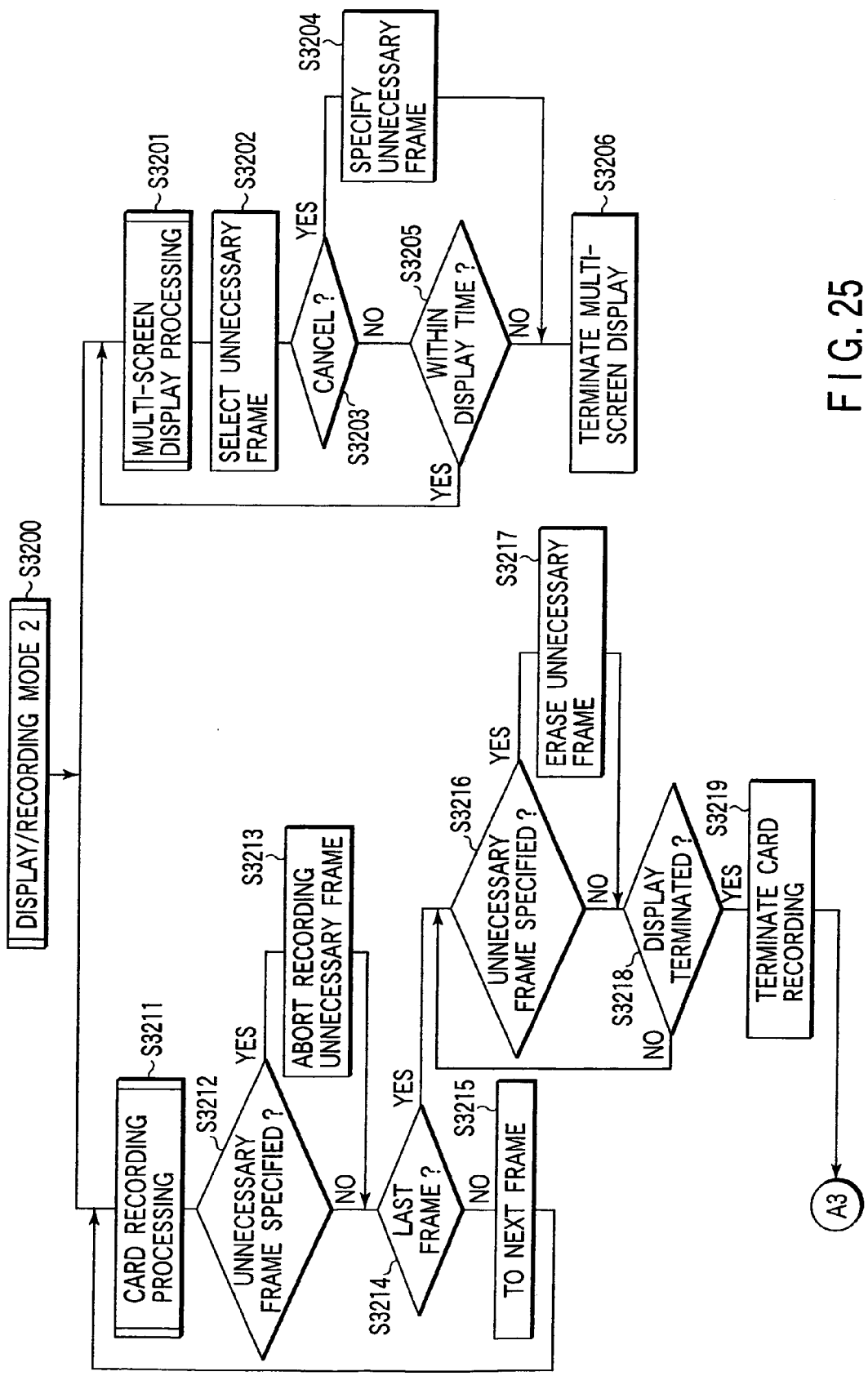
FIG. 25 is a flow chart illustrating an exemplary operation when a display/recording mode 2 is selected in Embodiment 3A of the present invention.

Next, the following description will center on a routine executed when the display/recording mode 2 has been selected with reference to the flow chart of FIG. 25. Likewise, in this display/recording mode 2 (S3200), after the set capturing is completed, the display (rec-view) processing and the card recording processing are performed temporally in parallel.

Multi-screen display processing (S3201) reduces the size of a plurality of images captured by set capturing and displays the images in a reduced size on a single screen as a collection of images, i.e., a multi-screen display. Specifically, image data stored in the buffer memory 16 undergoes the processing required for the multi-screen display, and for example, as illustrated in FIG. 15, a plurality of images captured by the set capturing are provided on the image display LCD 22 as the multi-screen display.

The photographer may view the multi-screen display on the image display LCD 22 to determine images which should be recorded on the memory card (recording medium 19) and images which should not be recorded. An image which should not be recorded on the memory card, i.e., an unnecessary frame, may be selected using the cross key 26h3 or the like. In the example of FIG. 15, a mark "E" is displayed in a lower left region of an image selected from the respective images (labeled set capturing frame numbers SE1-SE5) captured by the set capturing (S3202). By thus selecting an unnecessary frame on the screen and then depressing the cancel switch 26d3, the unnecessary frame can be designated (S3203, S3204). The designation of an unnecessary frame can be accepted as long as the multiple images are being displayed on the screen (S3205). As the display period expires, the multi-screen display is terminated (S3206).

Operations at respective steps (S3211-S3219) in the card recording processing are similar to those at the corresponding steps (S3111-S3119) in the display/recording mode 1 illustrated in FIG. 24. Specifically, image data of respective frames captured by set capturing are sequentially recorded on the memory card. However, for those frames which have been designated as recording not required during the summary display processing, the recording of the image data on the memory card is aborted, or the image data once recorded on the memory card is erased.

In this way, since captured images are displayed after the completion of the set capturing in the display/recording modes 1 and 2, unnecessary images can be readily confirmed. Particularly, the display/recording mode 1 is advantageous in providing a wider display area for one image, which facilitates the viewing, since every image is displayed over the entire screen through the summary display. The display/recording mode 2 in turn is advantageous in facilitating a comparison among respective images since these images produced by set capturing are simultaneously displayed through the multi-screen display.

Also, since the display/recording modes 1 and 2 can terminate the card recording processing in a shorter period of time since the display processing and the card recording processing are performed temporally in parallel. Further, unnecessary images may be selectively designated during the display period to readily abort recording of image data on the memory card or erase image data once recorded on the memory card, thereby making it possible to avoid useless recording of such unnecessary images on the memory card.

Figure 26:
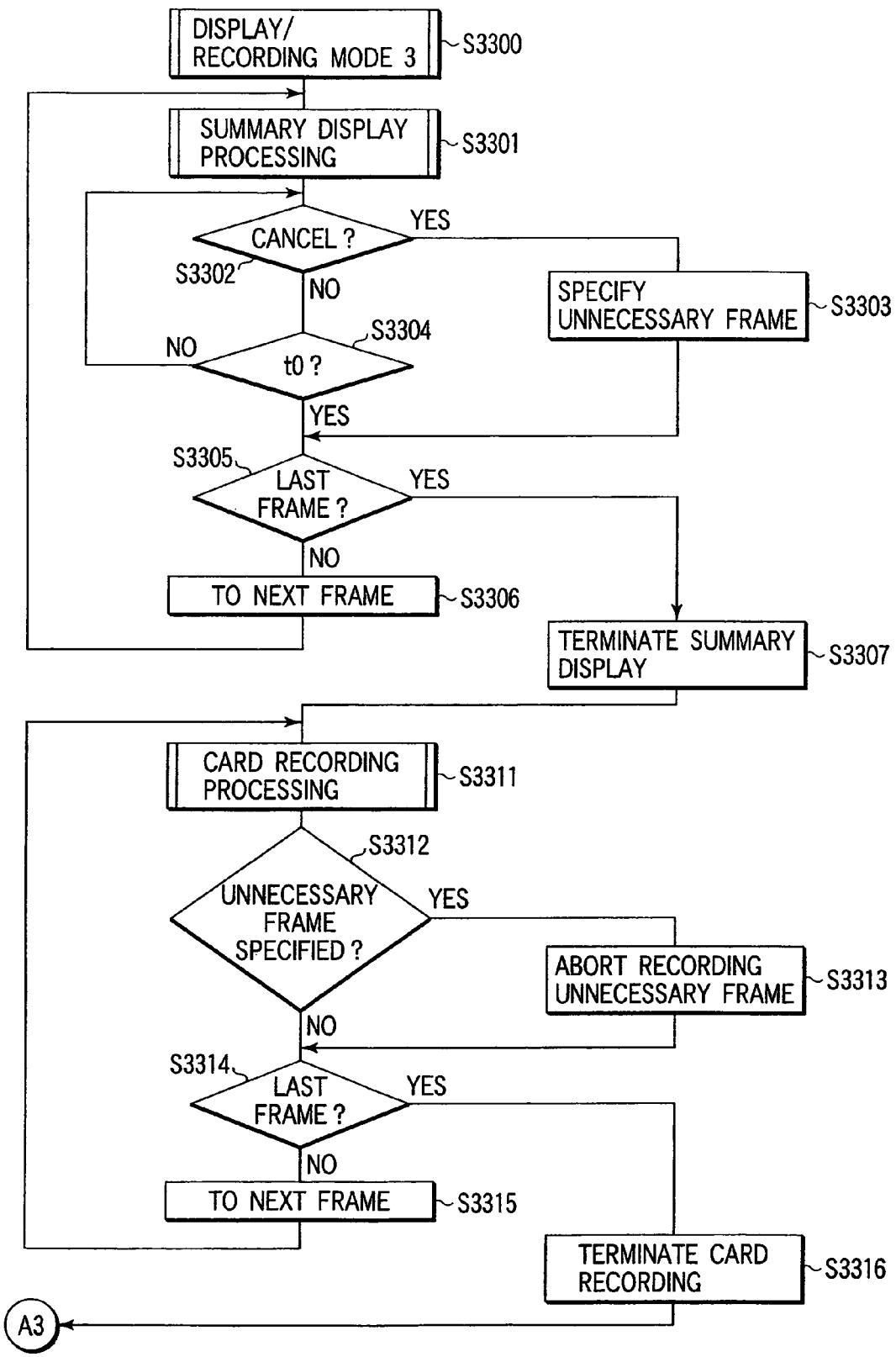
FIG. 26 is a flow chart illustrating an exemplary operation when a display/recording mode 3 is selected in Embodiment 3A of the present invention.

Next, the following description will center on a routine executed when the display/recording mode 3 has been selected with reference to the flow chart of FIG. 26. In this display/recording mode 3 (S3300), the display (rec-view) processing is performed after sequential capturing is completed, and the card recording processing is performed after the display processing.

Operations at respective steps (S3301-S3307) in the summary display processing are similar to those at the corresponding steps (S3101-S3107) in the display/recording mode 1 illustrated in FIG. 24. Specifically, respective images (frames) captured by set capturing are sequentially displayed on the image display LCD 22 at predetermined time intervals, and the cancel switch 26d3 is depressed to designate an unnecessary frame while the image is being displayed on the image display LCD 22.

Likewise, operations at S3311 to S3315 involved in the card recording processing are similar to those at the corresponding steps S3111-S3115 illustrated in FIG. 24. However, in the display/recording mode 3, since the card recording processing is performed after the summary display processing is competed, unnecessary frames have already been designated (S3302, S3303) at the time the card recording processing is started. For this reason, steps S3116 to S3118 illustrated in FIG. 24 are omitted. Therefore, in the display/recording mode 3, the processing completed for the last frame results in the termination of the recording of image data on the memory card (S3316).

Next, the following description will center on a routine executed when the display/recording mode 4 has been selected with reference to the flow chart of FIG. 27. Likewise, in this display/recording mode 4 (S3400), the display (rec-view) processing is performed after set capturing is completed, and the card recording processing is performed after the display processing. Also, in the display processing, images are viewed in a multi-screen display.

Operations at respective steps (S3401-S3406) in the multi-screen display processing are similar to those at the corresponding steps (S3201-S3206) of the display/recording mode 2 illustrated in FIG. 25. Specifically, any unnecessary frame is selected on the multi-image screen, and the cancel switch 26d3 is then depressed to designate the unnecessary frame.

Likewise, operations at steps S3411 to S3415 in the card recording processing are similar to those at the corresponding steps S3211 to S3215 illustrated in FIG. 25. However, in the display/recording mode 4, since the card recording processing is performed after the multi-screen display processing is completed, the steps S3216 to S3218 illustrated in FIG. 25 are omitted, the processing completed for the last frame results in the termination of the recording of image data on the memory card (S3416).

As described above, in the display/recording modes 3 and 4, since captured images are displayed after the set capturing is completed, unnecessary images can be readily determined as is the case of the display/recording modes 1 and 2.

Figure 28:
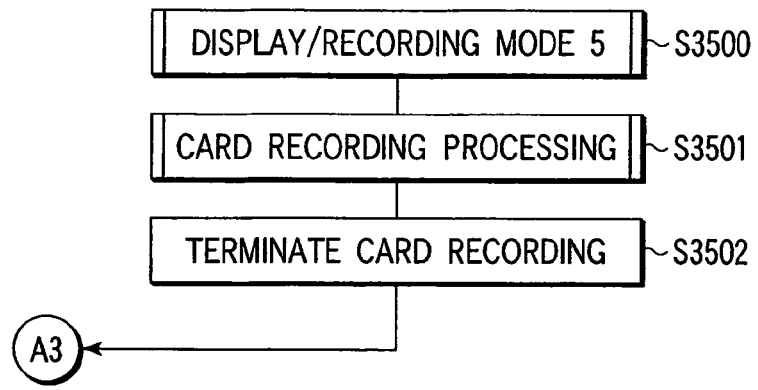
FIG. 28 is a flow chart illustrating an exemplary operation when a display/recording mode 5 is selected in Embodiment 3A of the present invention.

Next, the following description will center on a routine executed when the display/recording mode 5 has been selected with reference to the flow chart of FIG. 28.

In this display/recording mode 5 (S3500), no image is displayed, so that the card recording processing is immediately entered after set capturing is completed (S3501). As image data of respective images captured by the set capture are recorded on the memory card, the card recording is completed (S3502), followed by the routine proceeding again to a capturing enabled state (step S3014 in FIG. 20).

Embodiment 3B

Next, Embodiment 3B will be described with reference to a flow chart of FIG. 29 and the like. It should be noted that the configuration of the electronic camera is similar to that illustrated in FIG. 19 which has been described in Embodiment 3A.

Figure 29:
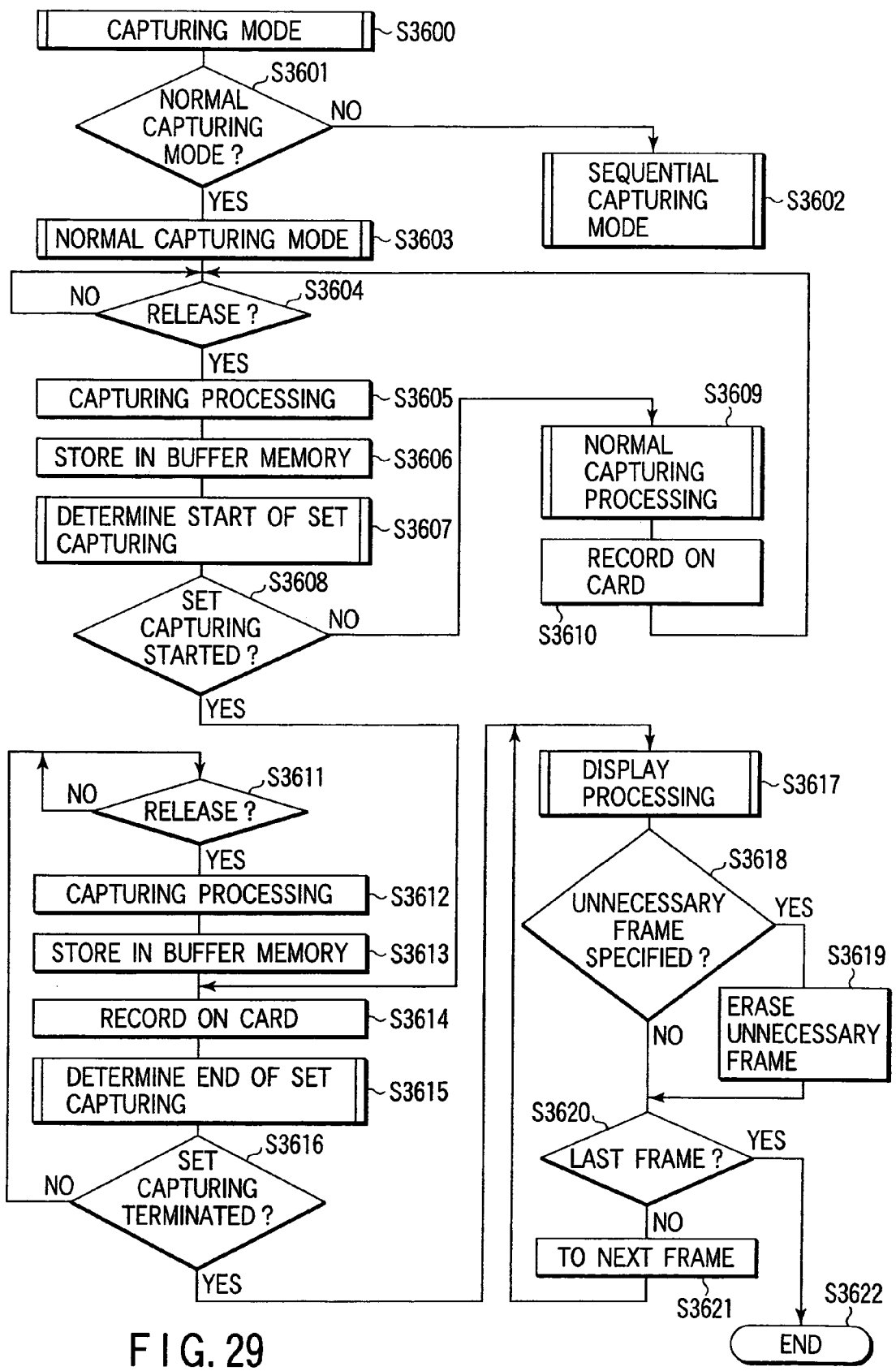
FIG. 29 is a flow chart illustrating an exemplary operation of Embodiment 3B of the present invention.

In the flow chart of FIG. 29, assume that a desired capturing mode has been selected through the capturing mode selection switch 26b3 (S3600). First, a capturing mode is identified (S3601), and when a sequential capturing mode is identified, predetermined sequential capturing processing is performed (S3602).

In a normal capturing mode (S3603), as the release switch 26a3 is depressed (S3604), predetermined capturing processing is performed (S3605), and image data produced by the capturing is stored in the buffer memory 16 (S3606). Subsequently, it is determined whether or not set capturing is started (S3607, S3608). If it is determined that no set capturing is performed, normal capturing processing is performed (S3609), and image data of captured images are recorded on the memory card (S3610).

Figure 30A:
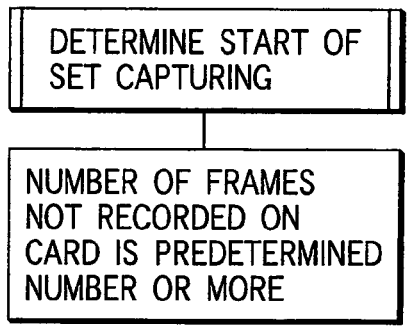
FIGS. 30A and 30B show how to determine that set capturing is started in Embodiment 3B of the present invention.

Here, the set capturing start determination will be described with reference to FIGS. 30A, 30B. In an example of FIG. 30A, the start of the set capturing is determined when the number of image frames which have not been recorded on the memory card within image data stored in the buffer memory is equal to or more than a predetermined number, and it is determined that the set capturing has been started from the preceding capture. In an example of FIG. 30B, the start of set capturing is determined when the next capture is started before an image captured immediately previous thereto has not been recorded on the memory card, and it is determined that the set capturing has been started from the preceding capture.

When it is determined that set capturing is started (S3608), image data stored in the buffer memory is recorded on the memory card (S3614), and the capturing processing and the storage of the image data in the buffer memory are repeated (S3612, S3613) until it is determined that the set capturing is terminated (S3615, S3616). For determining that the set capturing is terminated, the method of FIG. 22A or 22B, previously described in Embodiment 3A, may be applied.

Figure 30B:
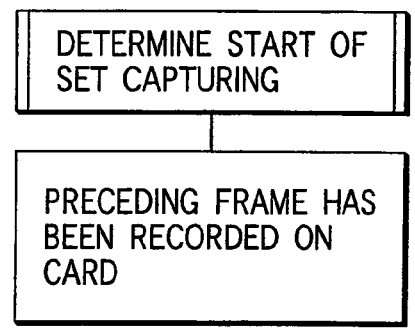
Figure 31:
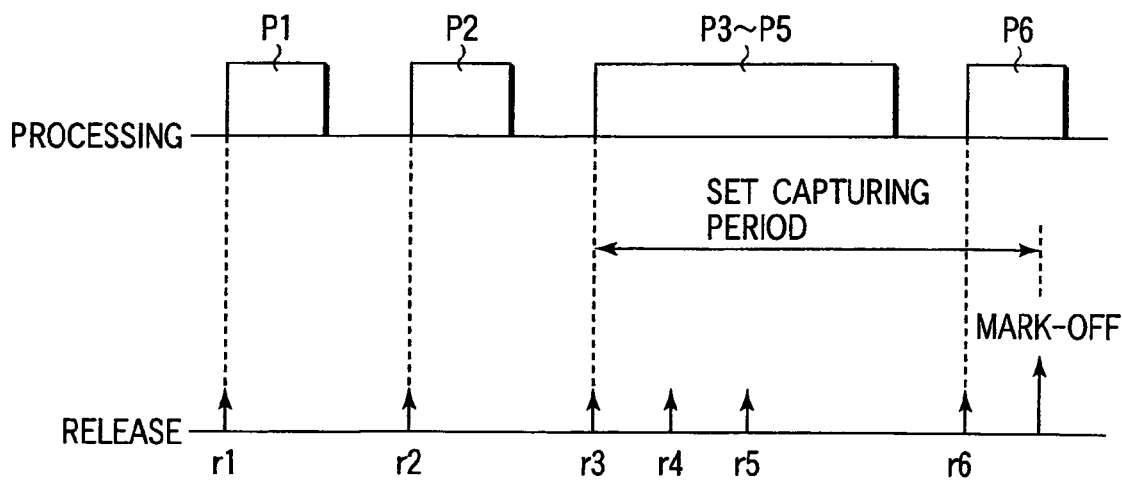
FIG. 31 is a diagram schematically showing how to determine when the set capturing is started and terminated in Embodiment 3B of the present invention.

FIG. 31 shows an example of the foregoing start and end determinations, wherein the start is determined with the method of FIG. 30B and the end is determined with the method of FIG. 22B. For example, since processing P1 (each processing such as γ conversion, color conversion and compression, recording on the memory card, and the like. A processing time required for one frame depends on an image quality mode and the like) performed after a manipulation r1 on the release switch has been completed before a manipulation r2 on the release switch, the start of the set capturing is not determined at the time of the manipulation r2 on the release switch. On the other hand, since processing P3 performed after a manipulation r3 on the release switch has not been completed at the time of a manipulation r4 on the release switch, the start of the set capturing is determined at the time of the manipulation r4 on the release switch, so that the processing proceeds on the assumption that the set capturing has been started from the time r3. Once the set capturing is started, a set capturing period continues even if the preceding frame has been processed at the time the release switch is manipulated, and the set capturing period is terminated by the photographer depressing the mark-off switch 26g3.

In the flow chart of FIG. 29, as the set capturing is terminated (S3616), the flow proceeds to the display processing. Respective images (frames) captured by the set capturing are displayed sequentially on the image display LCD 22 at predetermined time intervals (for example at intervals of one second) (S3617). A photographer may view images displayed on the image display LCD 22 to determine images whose image data should be recorded (preserved) on the memory card (recording medium 19) and images whose image data should not be recorded thereon. The images which should not be recorded on the memory card, i.e., unnecessary frames may be specified by depressing the cancel switch 26d3 while the image are being displayed on the image display LCD 22.

For frames marked as unnecessary frames, image data of these frames, once recorded on the memory card are erased, so that the image data of the frames are not eventually recorded (preserved) on the memory card (S3618, S3619). The processing is repeated sequentially until the last frame in this way (S3620, S3621), followed by the termination of the display of images captured by the set capturing and the erasure of unnecessary frames (S3622).

While in the foregoing embodiment, the respective images captured by the set capturing are sequentially displayed on the image display LCD 22 at predetermined time intervals, the respective images captured by the set capturing may be displayed simultaneously on the image display LCD 22 using the multi-screen display previously described in Embodiment 3A.

Embodiment 3C

Next, Embodiment 3C will be described with reference to a flow chart of FIG. 32. It should be noted that the configuration of the electronic camera is similar to that illustrated in FIG. 19 which has been described in Embodiment 3A.

Figure 32:
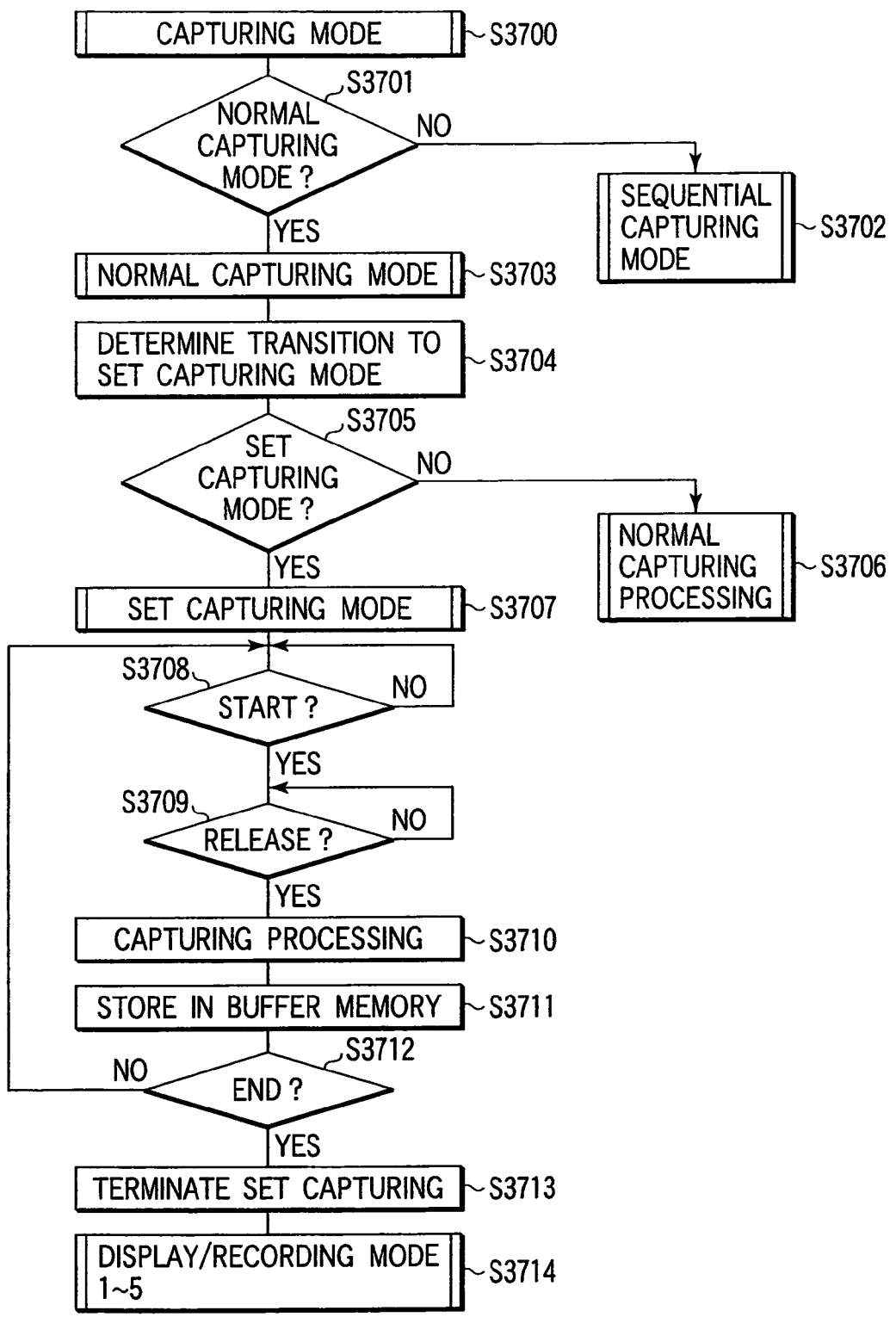
FIG. 32 is a flow chart illustrating an exemplary operation of Embodiment 3C of the present invention.

In the flow chart of FIG. 32, assume that a desired capturing mode has been selected through the capturing mode selection switch 26b3 (S3700). First, a capturing mode is identified (S3701), and when a sequential capturing mode is identified, predetermined sequential capturing processing is performed (S3702).

In a normal capturing mode (S3703), it is determined whether the flow proceeds to a set capturing mode (S3704, S3705). When the flow does not proceed to the set capturing, normal capturing processing is performed (S3706). The transition to the set capturing mode can be carried out by double clicking the capturing mode selection switch 26b3, as shown in a timing chart of FIG. 33.

Figure 33:
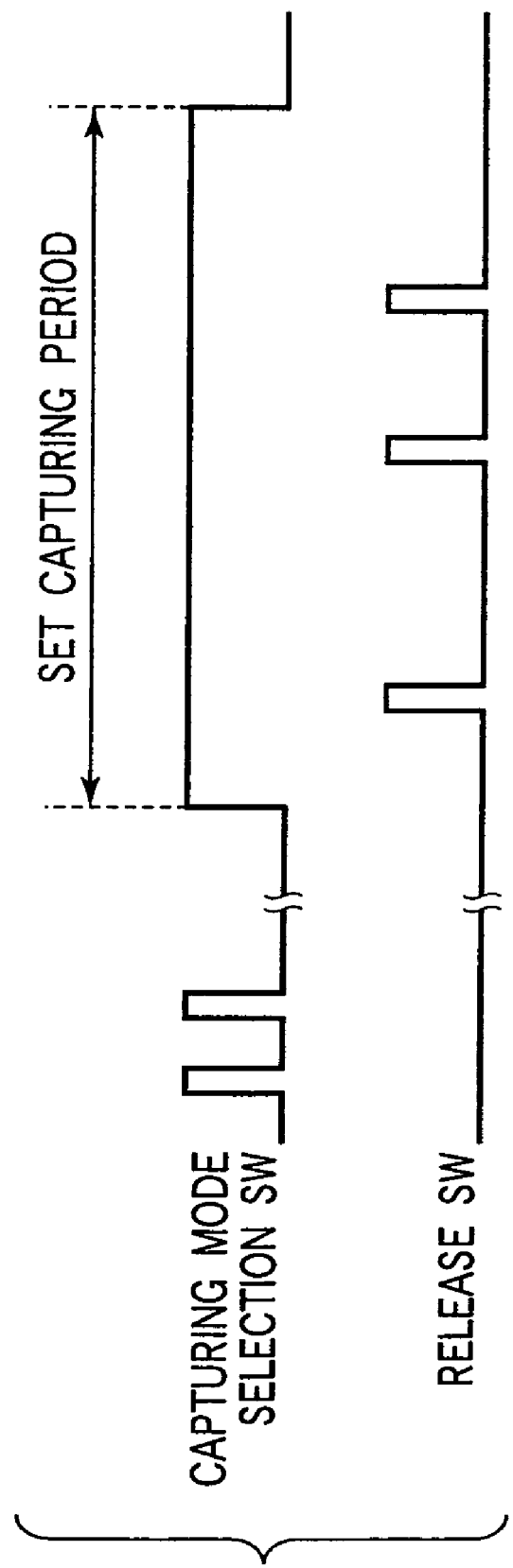
FIG. 33 is a diagram showing an exemplary switching operation for performing set capturing in Embodiment 3C of the present invention.

After the transition to the set capturing mode (S3707), the capturing mode selection switch is depressed to start a set capturing period (S3708). As shown in FIG. 33, when the release switch 26a3 is depressed with the capturing mode selection switch 26b3 held down (S3709), the predetermined capturing processing is performed (S3710) to store image data produced by the capturing is stored in the buffer memory 16 (S3711). In this way, the set capturing period continues as long as the capturing mode selection switch 26b3 is kept depressed, and the set capturing is performed each time the release switch 26a3 is depressed within the period.

As the capturing mode selection switch 26b3 is released from the depressed state (S3712), the set capturing period is terminated (S3713), and the flow proceeds to a routine associated with a display/recording mode previously selected from the five possible modes 1-5 through the display/recording mode selection switch 26c3 (S3714). The respective routines associated with the display/recording modes 1-5 are similar to those previously described in Embodiment 3A.

As described above, in this embodiment, since the set capturing is performed only while the capturing mode selection switch 26b3 is kept depressed, the photographer can capture images while distinguishing without fail the set capturing from the normal capturing.

In the examples described above, while images captured by the set capturing are displayed on the image display LCD 22, capture information during the set capturing may be displayed in combination with or independently of the images captured by the set capturing. In the following, description will be made on examples in which such capture information is displayed with reference to FIGS. 16 to 18.

An example illustrated in FIGS. 16A to 16C displays luminance information on each of images captured by set capturing (three images in this example) on the image display LCD 22.

FIG. 16A to FIG. 16C show luminance distributions for respective images captured by the set capturing. The horizontal axis represents the luminance of pixels included in a measuring area of AE, while the vertical axis represents the frequency of occurrence of each luminance. The measuring area may be the entire screen.

When set capturing is performed with exposure conditions intentionally varied to only record the one which exhibits the best result on the memory card, a sufficient evaluation may not be made only by displaying images. However, a correct evaluation can be made by displaying the luminance information as is done in this example.

Another example shown in FIG. 17 displays a variety of capture information on each of images captured by set capturing (three images in this example) represented by numerical values on the image display LCD 22.

A line "recording memory" display the capacity of memory required for recording each of the images (NO1-NO3) on the memory card. A line "AF" displays numerical values representative of AF evaluation amounts for each capture (100 is a maximum value, and the focus is more accurate as the value is larger). A line "AE" displays a shutter speed and an aperture value for each capture. A line "GV" displays the amount of strobe light emission for each capture, when strobe light is used for the capture, converted to a guide number.

For example, when set capturing is performed with the focus intentionally varied to record only the one which exhibits the best result on the memory card, a sufficient evaluation may not be made only by displaying images. However, a correct evaluation can be made by displaying the numerical information as is done in this example.

A further example illustrated in FIGS. 18A to 18C displays a focused area in each of images captured by set capturing (three images in this example) on the image display LCD 22 in an identifiable manner.

For example, a portion of an image having a spatial frequency equal to or higher than a fixed value is determined to be in focus, and this portion is displayed in an identifiable manner. This can be implemented using such methods as displaying only a focused area in a special color or in half tone, and the like. The examples illustrated in FIGS. 18A to 18C show (A) a person on the left side, standing behind, is focused; (B) a person in a central portion, standing in front, is focused; and (C) either of persons is not focused. The focused areas are displayed with an emphasized red component.

By thus displaying the capture information during the set capturing on the screen, a correct evaluation can be accomplished even when the evaluation is difficult with a captured image. It is therefore possible to readily select those images which need be recorded on the memory card or those images which need not be recorded on the memory card.

According to Embodiment 3, it is possible to provide an electronic camera which improves the usability, handling of image data, and the like, with the ability of readily distinguishing images which need be recorded (preserved) on a recording medium from images which need not be recorded, and the like when the set capturing is performed.

As described above, the present invention provides an electronic camera having a rec-view function which is capable of performing a summary image display, a multi-screen display, or an image property (corresponding to the capture information) display in parallel with recording of captured images on a memory card. These displays can be relied on to readily identify frames which need not be recorded on the memory card and to promptly abort a recording operation for frames which need not be recorded during the recording of captured images on the memory card. It will therefore be appreciated that the electronic camera according to the present invention can prevent useless recording of images on the memory card, reduce a capturing interval, and effectively utilize a recording region on the memory card.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic camera capable of sequentially capturing images, comprising:
   imaging means for optoelectrically converting a subject image to produce electronic image data;
   temporary storage means for temporarily storing a plurality of image data produced by said imaging means based on sequential capturing;
   recording means for recording the image data stored in said temporary storage means on a recording medium;
   image display means for displaying an image based on the image data;
   instructing means for distinguishing images whose image data are to be preserved on the recording medium from images whose image data are not preserved on the recording medium; and
   control means operative after completion of the sequential capturing for controlling said image display means to display thereon images based on the respective image data produced by the sequential capturing, and for controlling said recording means not to preserve on the recording medium the image data of images which have been distinguished as not being preserved on the basis of an instruction from said instructing means within the plurality of image data produced by the sequential capturing.

2. An electronic camera capable of sequentially capturing images, comprising:
   imaging means for optoelectrically converting a subject image to produce electronic image data;
   temporary storage means for temporarily storing a plurality of image data produced by said imaging means based on sequential capturing;
   recording means for recording the image data stored in said temporary storage means on a recording medium;
   image display means for displaying an image based on the image data;
   instructing means for distinguishing images whose image data are to be preserved on the recording medium from images whose image data are not preserved on the recording medium; and
   control means operative after completion of the sequential capturing for controlling said image display means to display thereon images based on the respective image data produced by the sequential capturing and controlling said recording means in parallel to record the image data produced by the sequential capturing on the recording medium, and for controlling said recording means not to preserve on the recording medium the image data of images which have been distinguished as not being preserved on the basis of an instruction from said instructing means within the plurality of image data produced by the sequential capturing.

3. An electronic camera capable of sequentially capturing images, comprising:
   imaging means for optoelectrically converting a subject image to produce electronic image data;
   temporary storage means for temporarily storing a plurality of image data produced by said imaging means based on sequential capturing;
   recording means for recording the image data stored in said temporary storage means on a recording medium;
   image display means for displaying an image based on the image data;
   instructing means for distinguishing images whose image data are to be preserved on the recording medium from images whose image data are not preserved on the recording medium; and
   control means operative after completion of the sequential capturing for controlling said image display means to display thereon images based on the respective image data produced by the sequential capturing, operative after completion of the display for controlling said recording means to record the image data produced by the sequential capturing on the recording medium, and for controlling said recording means not to preserve on the recording medium the image data of images which have been distinguished as not being preserved on the basis of an instruction from said instructing means within the plurality of image data produced by the sequential capturing.

4. An electronic camera according to claim 1, wherein said image display means displays respective images based on the respective image data produced by the sequential capturing at fixed display time intervals, and said electronic camera further comprises display time interval setting means for setting said time interval.

5. An electronic camera according to claim 2, wherein said image display means displays respective images based on the respective image data produced by the sequential capturing at fixed display time intervals, and said electronic camera further comprises display time interval setting means for setting said time interval.

6. An electronic camera according to claim 3, wherein said image display means displays respective images based on the respective image data produced by the sequential capturing at fixed display time intervals, and said electronic camera further comprises display time interval setting means for setting said time interval.

7. An electronic camera according to claim 1, wherein said control means controls said electronic camera to restore a capturing enabled state after the image data has been recorded on the recording medium.

8. An electronic camera according to claim 2, wherein said control means controls said electronic camera to restore a capturing enabled state after the image data has been recorded on the recording medium.

9. An electronic camera according to claim 3, wherein said control means controls said electronic camera to restore a capturing enabled state after the image data has been recorded on the recording medium.

10. An electronic camera according to claim 1, wherein said image display means displays a plurality of images based on the respective image data produced by the sequential capturing as a collection of images comprised of a plurality of smaller screen regions.

11. An electronic camera according to claim 2, wherein said image display means displays a plurality of images based on the respective image data produced by the sequential capturing as a collection of images comprised of a plurality of smaller screen regions.

12. An electronic camera according to claim 3, wherein said image display means displays a plurality of images based on the respective image data produced by the sequential capturing as a collection of images comprised of a plurality of smaller screen regions.

13. An electronic camera according to claim 1, wherein said image display means displays capture information of the sequential capturing together with or independently of the images based on the image data produced by the sequential capturing.

14. An electronic camera according to claim 2, wherein said image display means displays capture information of the sequential capturing together with or independently of the images based on the image data produced by the sequential capturing.

15. An electronic camera according to claim 3, wherein said image display means displays capture information of the sequential capturing together with or independently of the images based on the image data produced by the sequential capturing.

* * * * *